(12) United States Patent
Bachmeyer et al.

(10) Patent No.: US 8,534,600 B2
(45) Date of Patent: *Sep. 17, 2013

(54) AIRCRAFT LANDING GEAR ASSEMBLY SHIMMY DAMPER

(75) Inventors: Paul J. Bachmeyer, Verona (IT);
Douglas A. Swanson, Cary, NC (US);
Bryan J. Pittman, Fuquay-Varina, NC (US); Scott K. Thompson, Erie, PA (US); Doug A. Hodgson, Fuquay-Varina, NC (US)

(73) Assignee: Lord Corporation, Cary, NC (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/538,241

(22) Filed: Aug. 10, 2009

(65) Prior Publication Data
US 2009/0294583 A1 Dec. 3, 2009

Related U.S. Application Data

(63) Continuation of application No. 11/375,945, filed on Mar. 15, 2006, now Pat. No. 7,571,876, which is a continuation-in-part of application No. 11/038,851, filed on Jan. 19, 2005, now Pat. No. 7,578,465.

(60) Provisional application No. 60/537,704, filed on Jan. 20, 2004.

(51) Int. Cl.
*B64C 25/00* (2006.01)
*F16F 1/00* (2006.01)

(52) U.S. Cl.
USPC .......... 244/100 R; 244/102 R; 188/381; 267/134; 267/136; 267/140.11

(58) Field of Classification Search
USPC ......... 244/100 R, 102 R; 188/381; 267/134, 267/136, 140.11
See application file for complete search history.

(56) References Cited

U.S. PATENT DOCUMENTS 2,187,923 A 1/1940 Winkleman
2,484,919 A 10/1949 Westcott
(Continued)

FOREIGN PATENT DOCUMENTS
JP 11-321792 11/1999
WO WO 91/01457 2/1991
(Continued)

OTHER PUBLICATIONS

"Response to Office Action Dated Jun. 25, 2009" submitted during the prosecution of U.S. Appl. No. 11/956,118 on Nov. 24, 2009 (9 pages).

(Continued)

*Primary Examiner* — J. Woodrow Eldred

(57) ABSTRACT

An aircraft vehicular assembly is provided that includes a nonelastomeric outer tubular member having an inner axial center bore with a tubular cylindrical frictional interface contiguous smooth inner surface segment, and a nonelastomeric inner member having an outer bonding surface segment. The nonelastomeric inner member is rotationally received in the outer member inner axial center bore with the nonelastomeric inner strut member rotatable within said outer member. The assembly includes an elastomer encompassing the nonelastomeric inner strut member outer bonding surface segment. The elastomer has an inner bonding surface segment and an outer grooved elastomer surface, the inner bonding surface segment is bonded to the nonelastomeric inner member outer bonding surface segment. The assembly includes a grease disposed between the outer elastomer surface and the nonelastomeric outer member frictional interface inner surface segment with the greased grooved outer elastomer surface engaging the nonelastomeric outer member frictional interface inner surface segment and inhibiting an oscillating rotation.

8 Claims, 29 Drawing Sheets

(56) References Cited

U.S. PATENT DOCUMENTS

| | | | |
|---|---|---|---|
| 2,646,948 A | 7/1953 | Brown | |
| 3,232,597 A | 2/1966 | Gaydecki | |
| 3,399,851 A | 9/1968 | Racca | |
| 3,638,887 A | 2/1972 | Thurston | |
| 3,795,390 A | 3/1974 | Kendall et al. | |
| 3,807,668 A | 4/1974 | Whitener | |
| 4,007,894 A | 2/1977 | Hartel | |
| 4,088,286 A | 5/1978 | Masclet et al. | |
| 4,105,365 A | 8/1978 | Ferris et al. | |
| 4,284,255 A | 8/1981 | Masclet et al. | |
| 4,291,850 A | 9/1981 | Sharples | |
| 4,328,939 A | 5/1982 | Davies et al. | |
| 4,381,857 A | 5/1983 | Cook | |
| 4,407,396 A | 10/1983 | Sirven | |
| 4,537,374 A | 8/1985 | Barnoin et al. | |
| 4,540,142 A | 9/1985 | Veaux et al. | |
| 4,556,179 A | 12/1985 | Veaux et al. | |
| 4,561,612 A | 12/1985 | Masclet | |
| 4,630,788 A | 12/1986 | Veaux et al. | |
| 4,637,574 A | 1/1987 | Handwerk | |
| 4,702,438 A | 10/1987 | Levy et al. | |
| 4,773,514 A | 9/1988 | Gustafsson | |
| 4,821,983 A | 4/1989 | Aubry et al. | |
| 4,907,760 A | 3/1990 | Sealey et al. | |
| 4,925,198 A | 5/1990 | Ito et al. | |
| 4,957,279 A | 9/1990 | Thorn | |
| 4,964,516 A | 10/1990 | Thorn | |
| 4,979,595 A | 12/1990 | Paton | |
| 5,158,267 A | 10/1992 | Pascal | |
| 5,183,137 A | 2/1993 | Siwek et al. | |
| 5,184,465 A | 2/1993 | Howard et al. | |
| 5,230,407 A | 7/1993 | Smith et al. | |
| 5,257,680 A | 11/1993 | Corcoran et al. | |
| 5,299,761 A | 4/1994 | Robin et al. | |
| 5,310,139 A | 5/1994 | Derrien et al. | |
| 5,310,140 A | 5/1994 | Veaux et al. | |
| 5,325,943 A | 7/1994 | Ralph | |
| 5,392,882 A | 2/1995 | Mackovjak et al. | |
| 5,394,589 A | 3/1995 | Braeger et al. | |
| 5,482,260 A | 1/1996 | Schmidt | |
| 5,486,056 A | 1/1996 | Thorn | |
| 5,501,434 A | 3/1996 | McGuire | |
| 5,540,457 A | 7/1996 | Johnson | |
| 5,570,762 A | 11/1996 | Jentsch et al. | |
| 5,875,874 A | 3/1999 | Okabe et al. | |
| 6,129,186 A | 10/2000 | Blake, III | |
| 6,179,749 B1 | 1/2001 | Thorn et al. | |
| 6,182,925 B1 | 2/2001 | Kilner et al. | |
| 6,247,687 B1 | 6/2001 | Jensen et al. | |
| 6,290,038 B1 | 9/2001 | Jensen et al. | |
| 6,308,916 B1 | 10/2001 | Hrusch | |
| 6,328,259 B1 | 12/2001 | Bolukbasi | |
| 6,345,564 B1 | 2/2002 | Kilner et al. | |
| 6,371,263 B1 | 4/2002 | Hoose | |
| 6,386,528 B1 | 5/2002 | Thorn et al. | |
| 6,471,229 B2 | 10/2002 | Stewart | |
| 6,481,668 B2 | 11/2002 | Grossman | |
| 6,520,493 B2 | 2/2003 | Larsen | |
| 6,575,405 B2 | 6/2003 | Bryant et al. | |
| 6,609,682 B2 | 8/2003 | Rogers | |
| 6,669,298 B2 | 12/2003 | Thorn et al. | |
| 6,672,575 B2 | 1/2004 | Flower et al. | |
| 6,676,076 B1 | 1/2004 | Davies | |
| 6,805,320 B2 | 10/2004 | Derrien et al. | |
| 6,811,116 B1 | 11/2004 | Briancourt | |
| 6,824,100 B1 | 11/2004 | Cheetham | |
| 7,571,876 B2 * | 8/2009 | Bachmeyer et al. | 244/100 R |
| 7,578,465 B2 * | 8/2009 | Bachmeyer et al. | 244/100 R |
| 8,020,807 B2 | 9/2011 | Bachmeyer et al. | |
| 2003/0110880 A1 | 6/2003 | Tison et al. | |
| 2006/0032976 A1 | 2/2006 | Bachmeyer et al. | |
| 2006/0278755 A1 | 12/2006 | Bachmeyer et al. | |
| 2009/0152396 A1 | 6/2009 | Bachmeyer et al. | |
| 2012/0055630 A1 | 3/2012 | Bachmeyer et al. | |

FOREIGN PATENT DOCUMENTS

| | | |
|---|---|---|
| WO | WO 93/13333 | 7/1993 |
| WO | WO 2005/070761 | 8/2005 |

OTHER PUBLICATIONS

U.S. Appl. No. 11/956,118, filed on Dec. 13, 2007 by the Cessna Aircraft Corporation.

"Suggestion of Interference" filed on Apr. 9, 2008 by Cessna in U.S. Appl. No. 11/956,118, and Declarations of Nicholas V. Anderson and Darrin M. Jones filed therewith.

Protest Under 37 CFR 1.291 and associated papers filed concurrently herewith by the Lord Corporation in Cessna's U.S. Appl. No. 11/956,118.

Documents from Lord's files which contain the exhibits attached to Cessna's Anderson and Jones Declarations (6 pages comprising 3 documents, i.e., pp. 1-4, 5, and 6).

Equilibrium, Stability, and Damping [Ch. 10 of See How it Flies] 1996-2001, pp. 1-10 United States of America.

Europa Aircraft, Nose Wheel Shimmy Damper Issue 1, pp. 1-2, Sep. 2001.

Lord Corporation, Background Information on Shimmy Problems, Apr. 1999, pp. 1-2, United States of America.

Lord Corporation, Damper Stops Wheel Wobble, As seen in Design News, Sep. 3, 2001, United States of America.

Lord Corporation, General Aviation Shimmy Damper, Aerospace, pp. 1-2, 2003, United States of America.

Lord Corporation, Shimmy Damper FAQ, Aerospace, pp. 1-2, United States of America.

Main Landing Gear, Integrated Publishing, pp. 1-4 United States of America.

Morrison et al., Aircraft Landing Gear Simulation and Analysis, 1995 Session 1620, pp. 1-8, Chicago, IL.

Sacramento Sky Ranch, Cessna Nose Wheel Shimmy, 2003, pp. 1-3.

Somieski, Shimmy Analysis of Aircraft Landing Gears, pp. 1-13.

Somieski, Shimmy Analysis of a Simple Aircraft Nose Landing Gear Model Using Different Mathematical Methods, pp. 1-10.

Mar. 16, 2009 email from M. Honeyman to M. Klee.

Mar. 12, 2009 "Joint Declaration by Nicholas V. Anderson and Darrin M. Jones" and Exhibits A and B thereto.

Apr. 24, 2009 email from M. Honeyman to M. Klee.

Apr. 23, 2009 "Request to Expedite Declaration of Interference Due to Allowance of Lord's Applications . . . " with Exhibits A-J thereto.

Loberg, B., Wobblel, Aug. 29, 2000, pp. 1-5 United States of America.

Supplemental Information Disclosure Statement from parent U.S. Appl. No. 11/038,851 (mailed to the PTO on Apr. 29, 2008).

"Revised Suggestion of Interference Incorporating Preliminary Amendments and Accounting for Protest Submitted by Lord" filed in U.S. Appl. No. 11/956,118 on Jun. 18, 2008 (with Attachments 1-6; total of 84 pages).

Lord Memorandum dated Apr. 25, 2003 by Paul J. Bachmeyer entitled "Cessna Mustang NLG Torsion SE Damper Proof of Concept Preliminary Design" (5 pages).

Webster's Third New International Dictionary of the English Language Unabridged, Encyclopedia Britannica, Chicago, 1993, pp. 198 and 306-307.

Random House Webster's Unabridged Dictionary, (2nd ed.), Random House, New York, 1998, pp. 188 and 287.

"Pre-Appeal Brief Request for Conference and Review" filed on Jul. 2, 2010 by the Cessna Aircraft Corporation in U.S. Appl. No. 11/956,118 (4 pages).

§3.07, Patent Interference Practice Handbook, Rosentock, Jerome, Aspen Publishers, New York, 2010 (pp. 3-12.1-3-12.10; 12 pages).

Nov. 5, 2010 Office Action for U.S. Appl. No. 11/956,118 (7 pages).

"Response to Office Action of November 15, 2010" filed on May 16, 2011 in U.S. Appl. No. 11/956,118 (13 pages).

Aug. 3, 2011 Office Action for U.S. Appl. No. 11/956,118 (8 pages).
"Response to Office Action of Aug. 3, 2011, Submitted Along with Request for Continued Examination" filed on Jan. 3, 2012 in U.S. Appl. No. 11/956,118 (15 pages).
Marshall Honeyman's Oct. 15, 2010 E-mail with attached Sep. 2, 2010 "Notice of Panel Decision from Pre-Appeal Brief Review" for U.S. Appl. No. 11/956,118 (3 pages).

Jun. 21, 2012 Office Action for U.S. Appl. No. 11/956,118 (8 pages).
Dec. 21, 2012 Notice of Appeal for U.S. Appl. No. 11/956,118 (6 pages).
May 21, 2013 Appellant's Brief for U.S. Appl. No. 11/956,118 (113 pages).

* cited by examiner

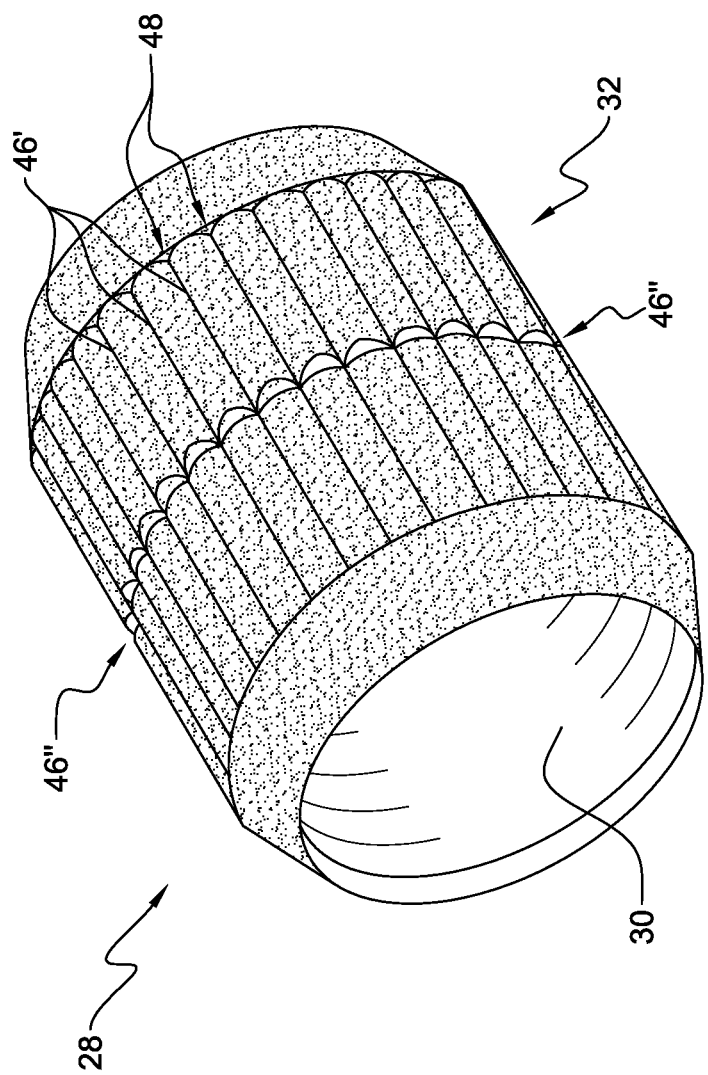

AIRCRAFT LANDING GEAR ASSEMBLY SHIMMY DAMPER

CROSS REFERENCE

This application is a continuation of co-pending U.S. application Ser. No. 11/375,945 filed Mar. 15, 2006, which is a Continuation in Part (CIP) of co-pending U.S. patent application Ser. No. 11/038,851 filed on Jan. 19, 2005, the benefit of both of which is claimed and both of which are incorporated by reference. This application claims the benefit of, and incorporates by reference, U.S. Provisional Patent Application No. 60/537,704 filed on Jan. 20, 2004.

FIELD OF THE INVENTION

The present invention relates to an aircraft landing gear and a method of making an aircraft landing gear assembly. More particularly the invention relates to aircraft landing gear with reduced oscillating shimmy rotation vibrations and methods for making a landing gear with a shimmy damper for reducing oscillating rotations.

BACKGROUND OF THE INVENTION

There is a need for an effective and economical means for making aircraft landing gear with improved performance and reliability. There is a need for economically feasible aircraft landing gear with a shimmy damper. There is a need for a robust system and method of making an aircraft landing gear shimmy damper for inhibiting oscillating

SUMMARY

The invention includes an aircraft vehicular front wheel landing gear assembly. The landing gear assembly includes a nonelastomeric outer upper strut tubular member having an inner axial center bore with a tubular cylindrical frictional interface inner surface segment. The landing gear assembly includes a nonelastomeric inner lower strut member having an outer bonding surface segment. The nonelastomeric inner member is rotationally received in the outer strut member inner axial center bore with the nonelastomeric inner strut member rotatable within said outer strut member. The landing gear assembly includes an elastomeric surface effect damper member encompassing the nonelastomeric inner strut member outer bonding surface segment. The elastomeric surface effect damper member has an inner bonding surface segment and an outer elastomer surface. The elastomeric surface effect damper inner bonding surface segment is bonded to the nonelastomeric inner strut member outer bonding surface segment. The landing gear assembly includes a surface effect lubricant disposed between the elastomeric surface effect damper outer elastomer surface and the nonelastomeric outer strut member frictional interface inner surface segment with the elastomeric surface effect damper outer elastomer surface engaging the nonelastomeric outer strut member frictional interface inner surface segment and inhibiting an oscillating shimmy rotation of the nonelastomeric inner lower strut member.

The invention includes a method of making an aircraft vehicular front wheel landing gear assembly. The method includes providing a nonelastomeric outer upper strut tubular member having an inner axial center bore with a tubular cylindrical frictional interface inner surface segment. The method includes providing a nonelastomeric inner lower strut member rotationally receivable in the outer strut member inner axial center bore with the nonelastomeric inner strut member rotatable within said outer strut member. The nonelastomeric inner lower strut member has an outer bonding surface segment. The method includes bonding an elastomeric surface effect damper member to said nonelastomeric inner strut member outer bonding surface segment, with said elastomeric surface effect damper member having an outer elastomer surface distal from said nonelastomeric inner strut member outer bonding surface segment. The method includes rotationally receiving said nonelastomeric inner strut rotationally receivable member in said outer strut member inner axial center bore with said nonelastomeric inner strut member rotatable within said outer strut member with said elastomeric surface effect damper outer elastomer surface engaging said nonelastomeric outer strut member frictional interface inner surface segment and inhibiting an oscillating shimmy rotation of said nonelastomeric inner lower strut member.

The invention includes a method of making a shimmy damper for damping a rotating oscillation. The method includes providing a nonelastomeric outer upper tubular member having an inner axial center bore with a tubular cylindrical frictional interface inner surface segment. The method includes providing a nonelastomeric inner lower member rotationally receivable in said outer member inner axial center bore with said nonelastomeric inner member rotatable within said outer member. The nonelastomeric inner member has an outer bonding cylindrical surface segment. The method includes bonding an elastomeric surface effect damper member to said nonelastomeric inner member outer bonding cylindrical surface segment, with said elastomeric surface effect damper member having an outer grooved elastomer surface distal from said nonelastomeric inner member outer bonding cylindrical surface segment. The method includes rotationally receiving said nonelastomeric inner member in said outer member inner axial center bore with said nonelastomeric inner member rotatable within said outer member with said elastomeric surface effect damper outer grooved elastomer surface engaging said nonelastomeric outer member frictional interface inner surface segment and inhibiting an oscillating shimmy rotation of said nonelastomeric inner member.

The invention includes a shimmy damper for damping a rotating oscillation. The shimmy damper includes a nonelastomeric outer upper tubular member having an inner axial center bore with a tubular cylindrical frictional interface inner surface segment and a nonelastomeric inner lower member having an outer bonding cylindrical surface segment with the nonelastomeric inner member rotationally received in the outer member inner axial center bore with the nonelastomeric inner member rotatable within said outer tubular member. The shimmy damper includes an elastomeric surface effect damper member encompassing said nonelastomeric inner member outer bonding cylindrical surface segment, said elastomeric surface effect damper member having an inner bonding cylindrical surface segment and an outer grooved elastomer surface, said elastomeric surface effect damper inner bonding cylindrical surface segment bonded to said nonelastomeric inner member outer bonding cylindrical surface segment. The shimmy damper includes a surface effect lubricant, said surface effect lubricant disposed between said elastomeric surface effect damper outer grooved elastomer surface and said nonelastomeric outer member frictional interface inner surface segment with said elastomeric surface effect damper outer grooved elastomer surface engaging said nonelastomeric outer member frictional interface inner surface segment and inhibiting an oscillating shimmy rotation of said nonelastomeric inner member.

The invention includes a method of making a rotating oscillation damper for damping a rotating oscillation. The method includes providing a nonelastomeric outer tubular member having an inner axial center bore with a tubular cylindrical frictional interface inner surface segment. The method includes providing a nonelastomeric inner member rotationally receivable in said outer member inner axial center bore with said nonelastomeric inner member rotatable within said outer member, said nonelastomeric inner member having an outer bonding cylindrical surface segment. The method includes providing an elastomeric surface effect damper member mold for receiving said nonelastomeric inner member, said mold including an outer surface groove relief distal from said nonelastomeric inner member outer bonding cylindrical surface segment. The method includes providing an elastomer and molding said elastomer to said nonelastomeric inner member inside said mold to provide an elastomeric surface effect damper member bonded to said nonelastomeric inner member outer bonding cylindrical surface segment, with said elastomeric surface effect damper member having an outer grooved elastomer surface distal from said nonelastomeric inner member outer bonding cylindrical surface segment. The method includes rotationally receiving said nonelastomeric inner member in said outer member inner axial center bore with said nonelastomeric inner member rotatable within said outer member with said elastomeric surface effect damper outer grooved elastomer surface engaging said nonelastomeric outer member frictional interface inner surface segment and inhibiting an oscillating rotation of said nonelastomeric inner member. The invention includes making a rotating oscillation damper by providing a nonelastomeric outer tubular member having an inner axial center bore with a tubular cylindrical frictional interface inner surface segment, providing a nonelastomeric inner member rotationally receivable in said outer member inner axial center bore with said nonelastomeric inner member rotatable within said outer member, said nonelastomeric inner member having an outer bonding cylindrical surface segment, bonding an elastomeric surface effect damper member to said nonelastomeric inner member outer bonding surface segment with said elastomeric surface effect damper member having an outer elastomer surface distal from said nonelastomeric inner member outer bonding surface segment, receiving said nonelastomeric inner member in said outer member inner axial center bore with said nonelastomeric inner member rotatable within said outer member with said elastomeric surface effect damper outer elastomer surface engaging said nonelastomeric outer member frictional interface inner surface segment and inhibiting an oscillating rotation of said nonelastomeric inner member.

The invention includes an aircraft assembly, the assembly comprised of a nonelastomeric outer member having an inner axial center bore with a frictional interface smooth inner surface segment, a nonelastomeric inner member having an outer bonding surface segment, the nonelastomeric inner member rotationally received in the outer member inner axial center bore with the nonelastomeric inner member rotatable within the outer member, and an elastomeric shimmy damper member encompassing the nonelastomeric inner member outer bonding surface segment, the elastomeric shimmy damper member including an elastomer having an inner bonding surface segment and an outer grooved elastomer surface, the elastomeric damper inner bonding surface segment bonded to the nonelastomeric inner member outer bonding surface segment, and a grease, the grease disposed between the elastomeric damper outer grooved elastomer surface and the nonelastomeric outer member frictional interface inner surface segment with the elastomeric surface effect damper outer grooved elastomer surface engaging the nonelastomeric outer member frictional interface inner surface segment and inhibiting an oscillating shimmy rotation of the nonelastomeric inner member. Preferably the damper includes grease dams for maintaining the grease between the frictional interface inner surface segment and the outer grooved elastomer surface, preferably with the grease dams inhibiting migration of grease out of the frictional interface area.

The invention includes a method of making an assembly, the method including providing a nonelastomeric outer member having an inner axial center bore with a frictional interface inner surface segment and providing a nonelastomeric inner member rotationally receivable in the outer member inner axial center bore with the nonelastomeric inner member rotatable within the outer member, with the nonelastomeric inner member having an outer bonding surface segment. The method includes bonding an elastomer to the nonelastomeric inner member outer bonding surface segment, the elastomer having an outer elastomer surface distal from the nonelastomeric inner member outer bonding surface segment. The method includes receiving the nonelastomeric inner member in the outer member inner axial center bore with the nonelastomeric inner member rotatable within the outer member with the elastomer surface engaging the nonelastomeric outer member frictional interface inner surface segment and inhibiting a shimmy rotation of the nonelastomeric inner member relative to the nonelastomeric outer member. Preferably the damper includes a plurality of grease dams for inhibiting migration of grease out of the frictional interface area, preferably with the method including providing the outer elastomer surface with a plurality of grooves terminating with grease dams.

The invention includes a method of making a shimmy damper, the method including: providing a nonelastomeric outer tubular member having an inner axial center bore with a tubular cylindrical smooth frictional interface inner surface segment, providing a nonelastomeric inner member rotationally receivable in the outer member inner axial center bore with the nonelastomeric inner member rotatable within the outer member, the nonelastomeric inner member having an outer bonding cylindrical surface segment and an elastomer bonded to the nonelastomeric inner member outer bonding cylindrical surface segment. Preferably the elastomer has an outer elastomer surface distal from the nonelastomeric inner member outer bonding cylindrical surface segment, the outer elastomer surface including a plurality of grooves and a plurality of grease dams. The method includes receiving the nonelastomeric inner member in the outer member inner axial center bore with the nonelastomeric inner member rotatable within the outer member with the outer elastomer surface engaging the nonelastomeric outer member frictional interface inner surface segment and inhibiting an oscillating shimmy rotation of the nonelastomeric inner member.

The invention includes a shimmy damper for damping a rotating oscillation, the shimmy damper comprised of a nonelastomeric outer tubular member having an inner axial center bore with a tubular cylindrical frictional interface inner contiguous smooth surface segment. The damper includes a nonelastomeric inner member having an outer bonding cylindrical surface segment, the nonelastomeric inner member rotationally received in the outer member inner axial center bore with the nonelastomeric inner member rotatable within the outer member. The damper includes an elastomer encompassing the nonelastomeric inner member outer bonding surface segment, the elastomer having an inner bonding surface segment and an outer grooved elastomer surface, the elastomer inner bonding surface segment bonded to the nonelastomeric inner member outer bonding surface segment. The damper includes a grease, the grease disposed between the outer grooved elastomer surface and the nonelastomeric outer member frictional interface inner surface segment with the outer grooved elastomer surface engaging the nonelastomeric outer member frictional interface inner surface segment and inhibiting an oscillating shimmy rotation of the nonelastomeric inner member. Preferably the outer grooved elastomer surface includes a plurality of grooves, preferably with grease dams. Preferably the grooves include at least one groove type chosen from the groove type group comprised of helical segments grooves, axial grooves, and circumferential grooves. Preferably the outer grooved elastomer surface includes at least one mold axial flat, more preferably two mold flats which preferably provide mirror image surface halves. Preferably the damper includes a grease inlet for injecting grease after insertion of the elastomer and the nonelastomeric inner member into the outer tubular member.

The invention includes a method of making a damper, the method comprising: providing a nonelastomeric outer tubular member having an inner axial center bore with a tubular cylindrical frictional interface inner smooth surface segment, providing a nonelastomeric inner member rotationally receivable in the outer member inner axial center bore with the nonelastomeric inner member rotatable within the outer member, the nonelastomeric inner member having an outer bonding surface segment. The method includes providing an elastomer mold for receiving the nonelastomeric inner member, the mold including a mold flat and an outer surface groove relief distal from the nonelastomeric inner member outer bonding surface segment, providing an elastomer and molding the elastomer to the nonelastomeric inner member inside the mold to provide an elastomer damper member bonded to the nonelastomeric inner member outer bonding surface segment, with the elastomer damper member having a multi outer grooved elastomer surface distal from the nonelastomeric inner member outer bonding surface segment. The method includes receiving the nonelastomeric inner member in the outer member inner axial center bore with the nonelastomeric inner member rotatable within the outer member with the damper outer multigrooved elastomer surface engaging the nonelastomeric outer member frictional interface inner surface segment and inhibiting a relative rotation of the nonelastomeric inner member.

The invention includes a method of making a damper, the method includes providing a nonelastomeric outer tubular member having an inner axial center bore with a tubular cylindrical frictional interface inner surface segment, providing a nonelastomeric inner member rotationally receivable in the outer member inner axial center bore with the nonelastomeric inner member rotatable within the outer member, the nonelastomeric inner member having an outer bonding cylindrical surface segment. The method includes bonding an elastomer damper member to the nonelastomeric inner member outer bonding surface segment with the elastomer damper member having an outer elastomer surface distal from the nonelastomeric inner member outer bonding surface segment, the outer elastomer surface including at least one grease dam. The method includes receiving the nonelastomeric inner member in the outer member inner axial center bore with the nonelastomeric inner member rotatable within the outer member with the elastomer damper outer elastomer surface engaging the nonelastomeric outer member frictional interface inner surface segment. The method includes providing grease, and disposing the grease between the elastomer damper outer elastomer surface and the nonelastomeric outer member frictional interface inner surface segment with the grease dam containing the grease. Preferably the method includes injecting the grease through an inlet after receiving the inner member in the outer member. Preferably the method includes periodically injecting grease during use of the damper.

The invention includes a rotation damper for damping a rotating motion. The damper is comprised of a nonelastomeric outer tubular member having an inner axial center bore with a tubular cylindrical frictional interface inner contiguous smooth surface segment, a nonelastomeric inner member having an outer bonding surface segment, the nonelastomeric inner member received in the outer member inner axial center bore with the nonelastomeric inner member within the outer member. The damper includes an elastomer encompassing the nonelastomeric inner member outer bonding surface segment, the elastomer having an inner bonding surface segment and an outer grooved elastomer surface, the elastomer inner bonding surface segment bonded to the nonelastomeric inner member outer bonding surface segment and the outer grooved elastomer surface including a plurality of groove segments with grease dams. The damper includes a grease, the grease disposed in the groove segments and between the outer grooved elastomer surface and the nonelastomeric outer member frictional interface inner surface segment with the outer grooved elastomer surface engaging the nonelastomeric outer member frictional interface inner surface segment and inhibiting a rotation of the nonelastomeric inner member with the grease dams inhibiting a migration of the grease. Preferably outer grooved elastomer surface includes a plurality of helical groove segments, preferably all segments with grease dams proximate the upper or the lower end. Preferably the grooves include at least one groove type chosen from helical segments grooves, axial grooves, and circumferential grooves. Preferably the elastomer includes at least one mold axial flat, preferably two mold flats which preferably provide mirror image surface halves. Preferably the damper includes a grease inlet for injecting grease after insertion of the inner member and elastomer into the outer member, preferably with a grease receiving reservoir groove proximate the grease inlet. Preferably during use of the damper periodically scheduled maintenance grease injections inject grease through grease inlet into the grease reservoir.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 19 shows an elastomer component.

DETAILED DESCRIPTION OF THE PREFERRED EMBODIMENTS

Figure 1:
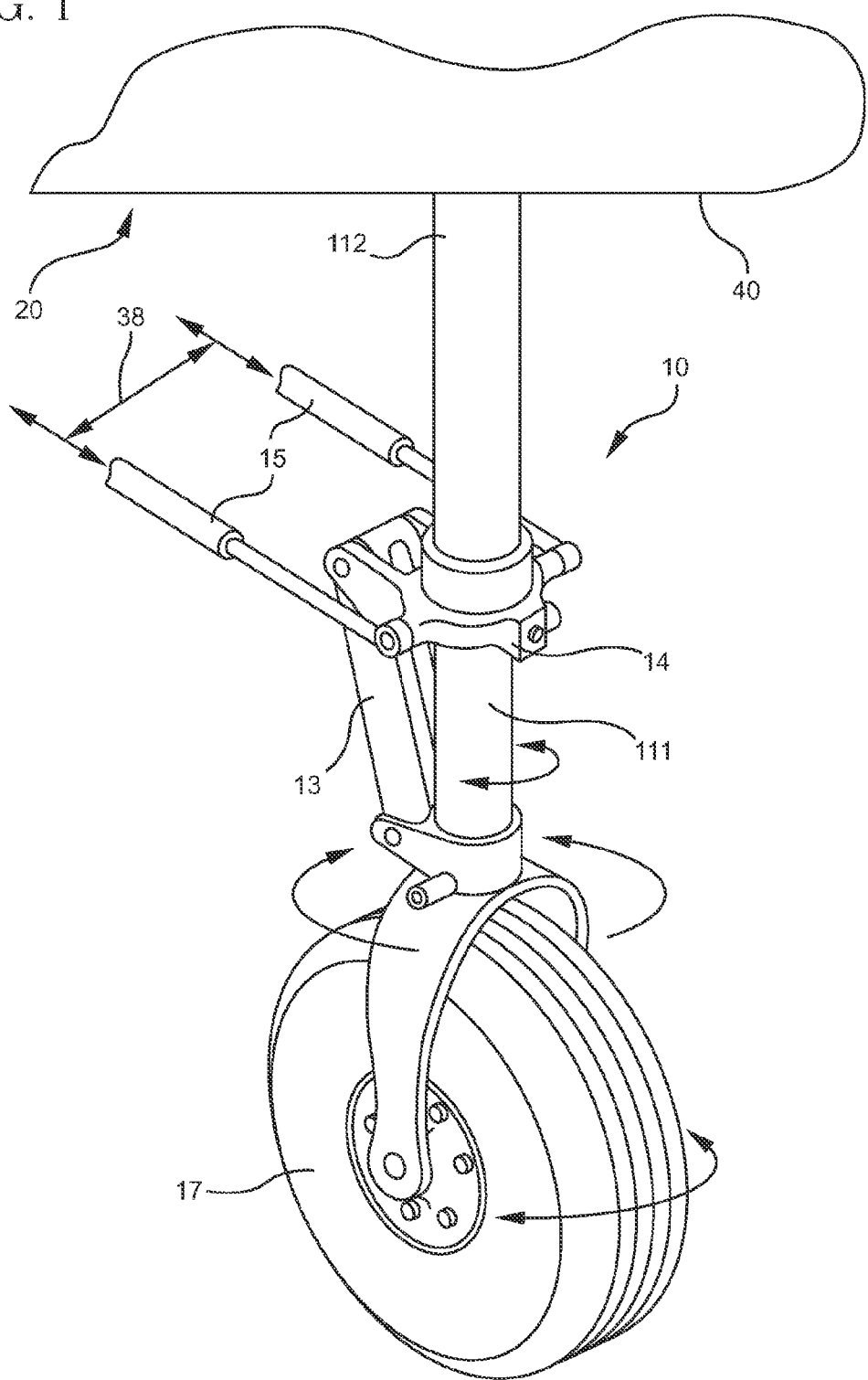
FIG. 1 shows an aircraft landing gear assembly.
Figure 2:
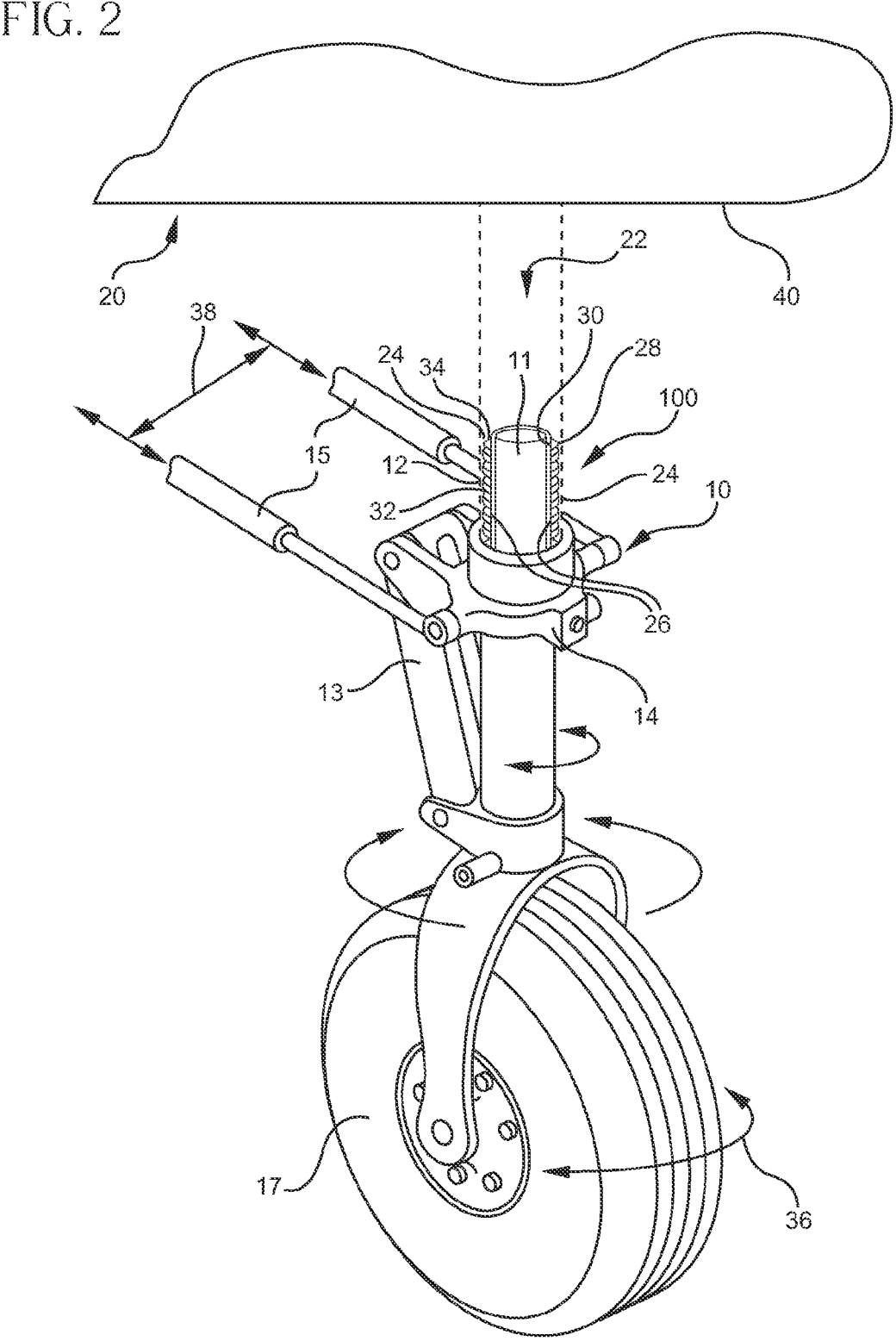
FIG. 2 shows an aircraft landing gear assembly with a cut away portion.
Figure 3:
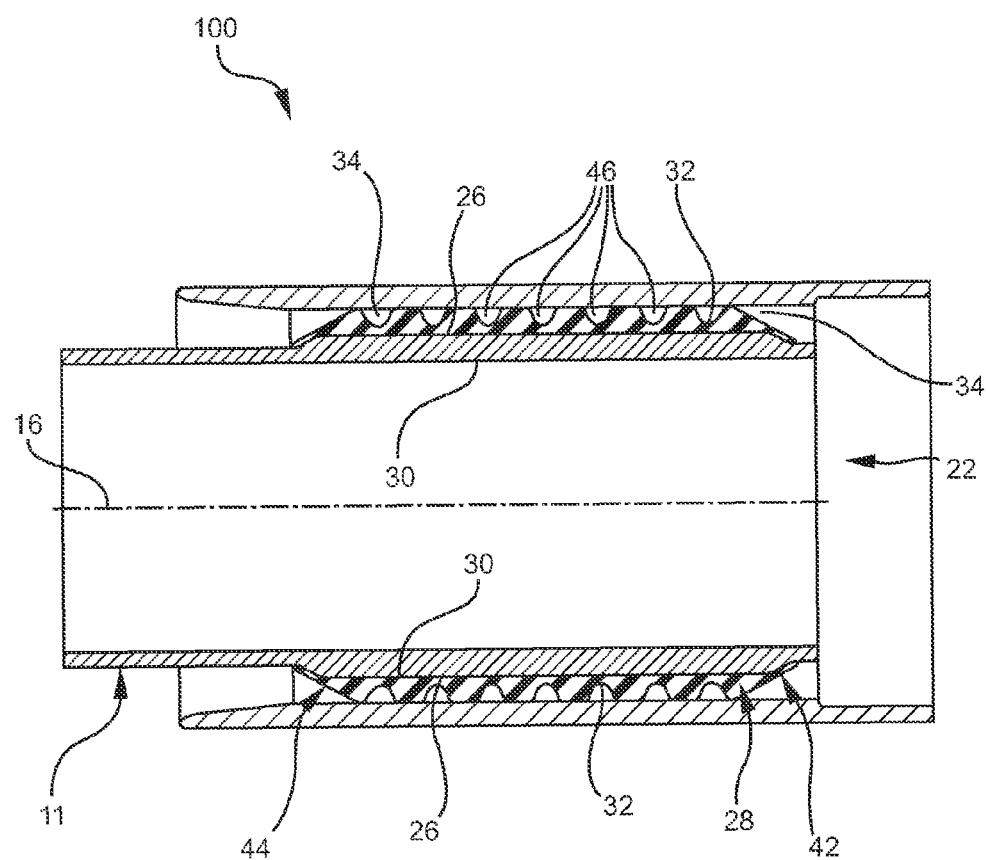
FIG. 3 shows a damper.
Figure 4:
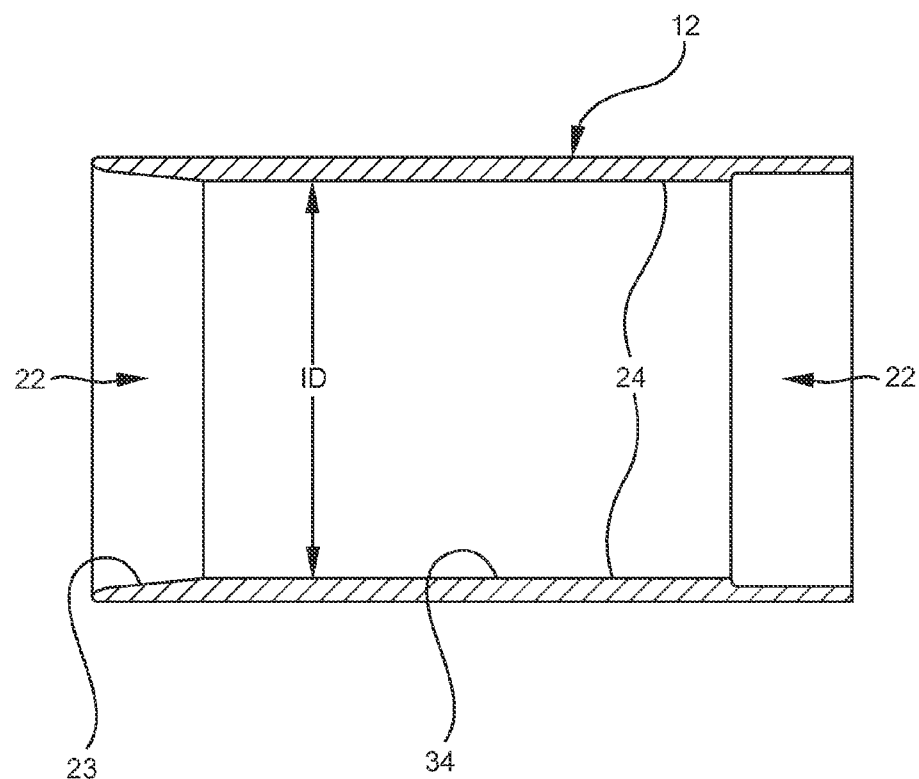
FIG. 4 shows an outer member damper component.
Figure 5:
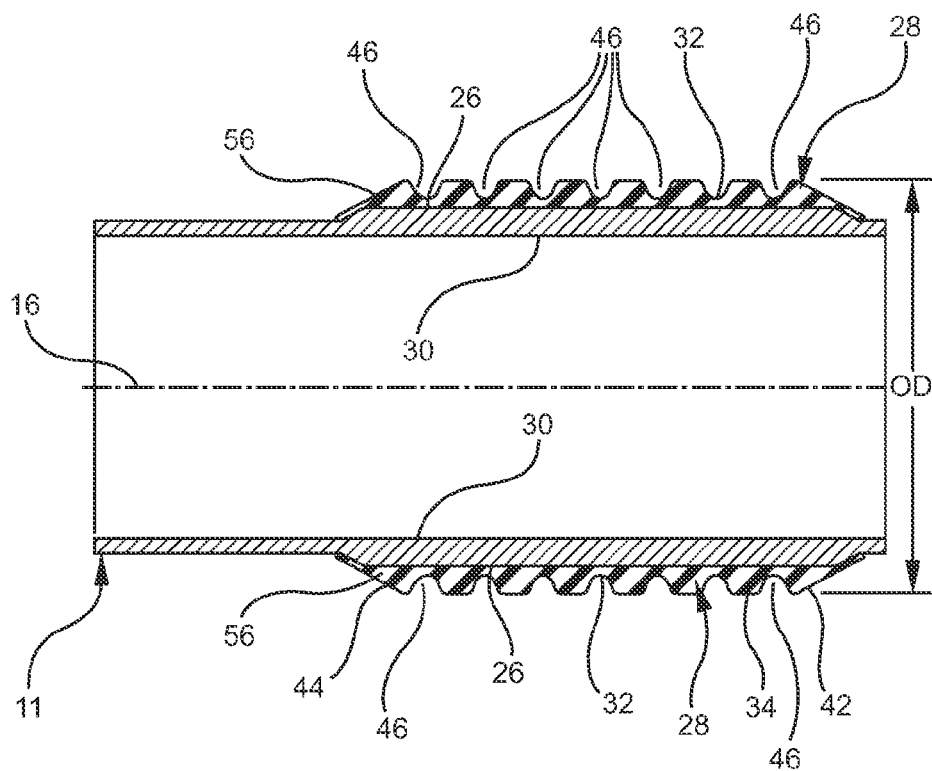
FIG. 5 shows an inner member damper component.
Figure 6:
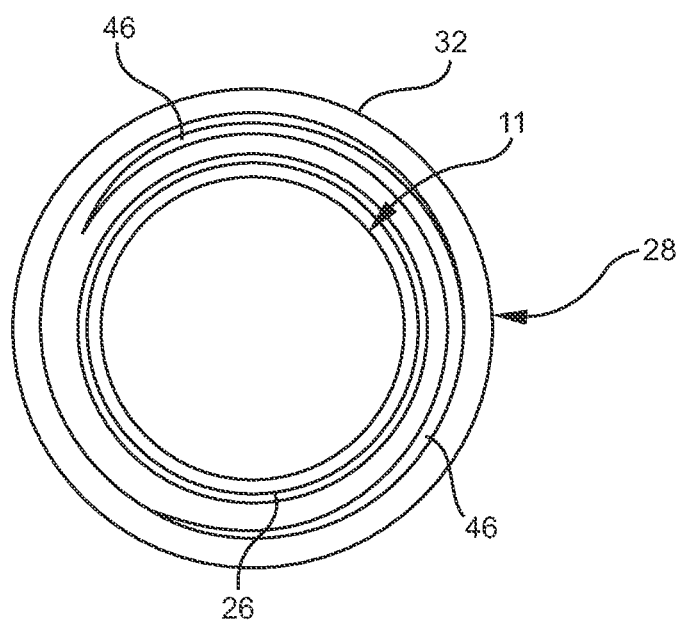
FIG. 6 shows an end view of the inner member damper component.
Figure 7:
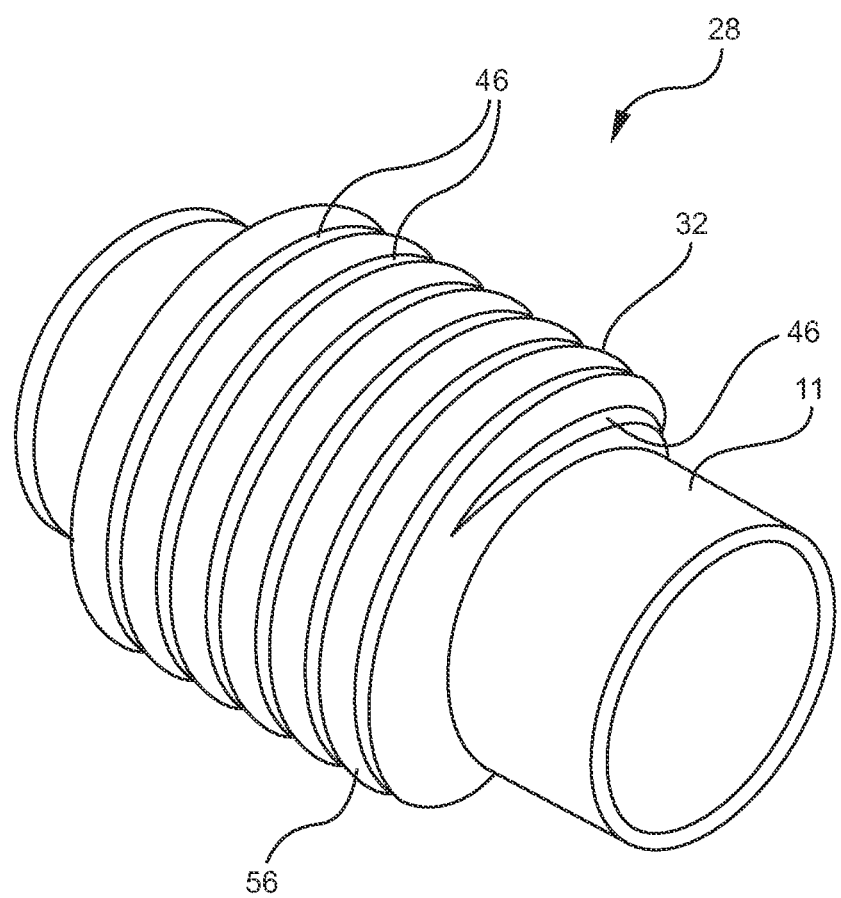
FIG. 7 shows an inner member damper component.
Figure 8:
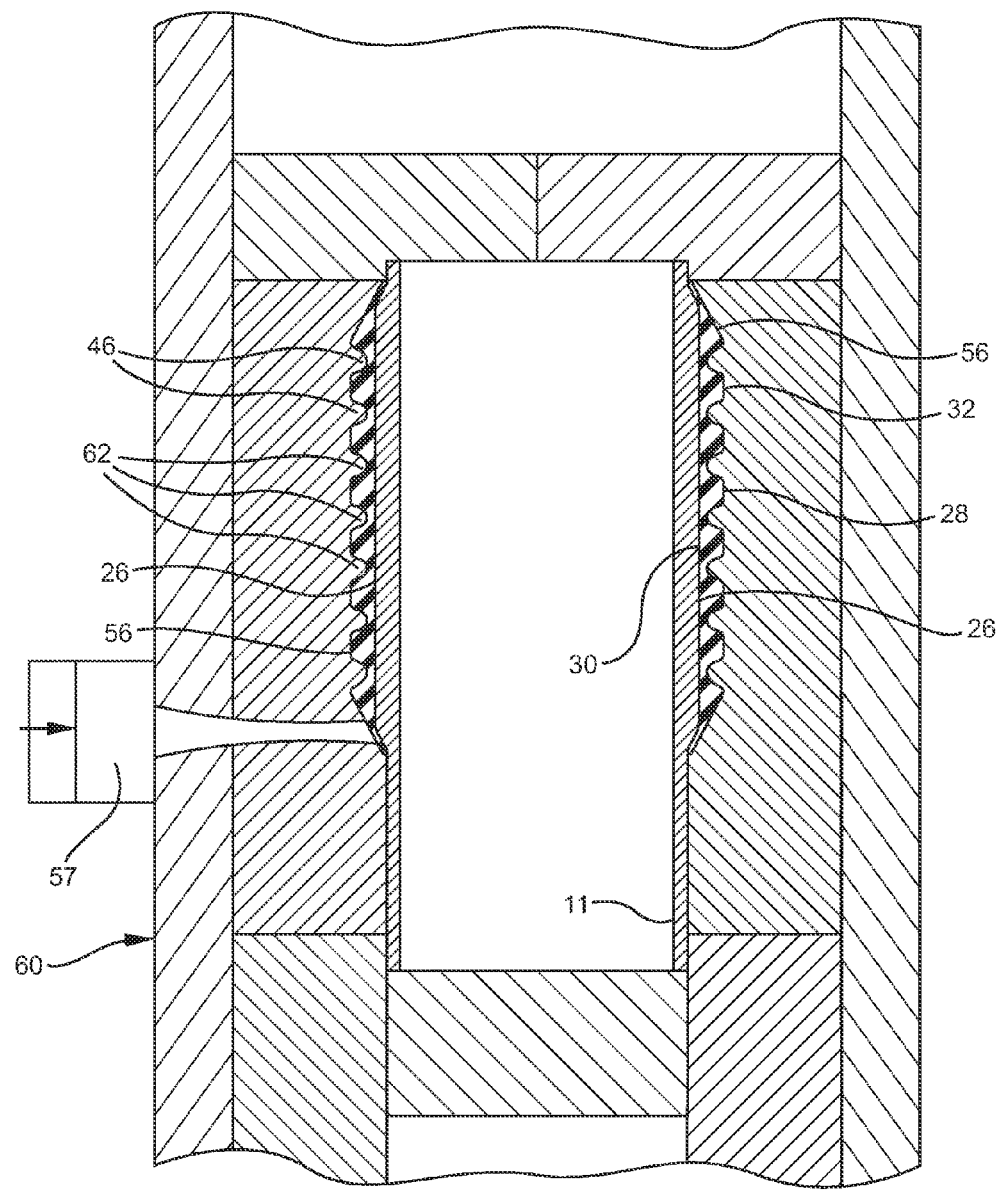
FIG. 8 shows molding an inner member damper component.
Figure 9:
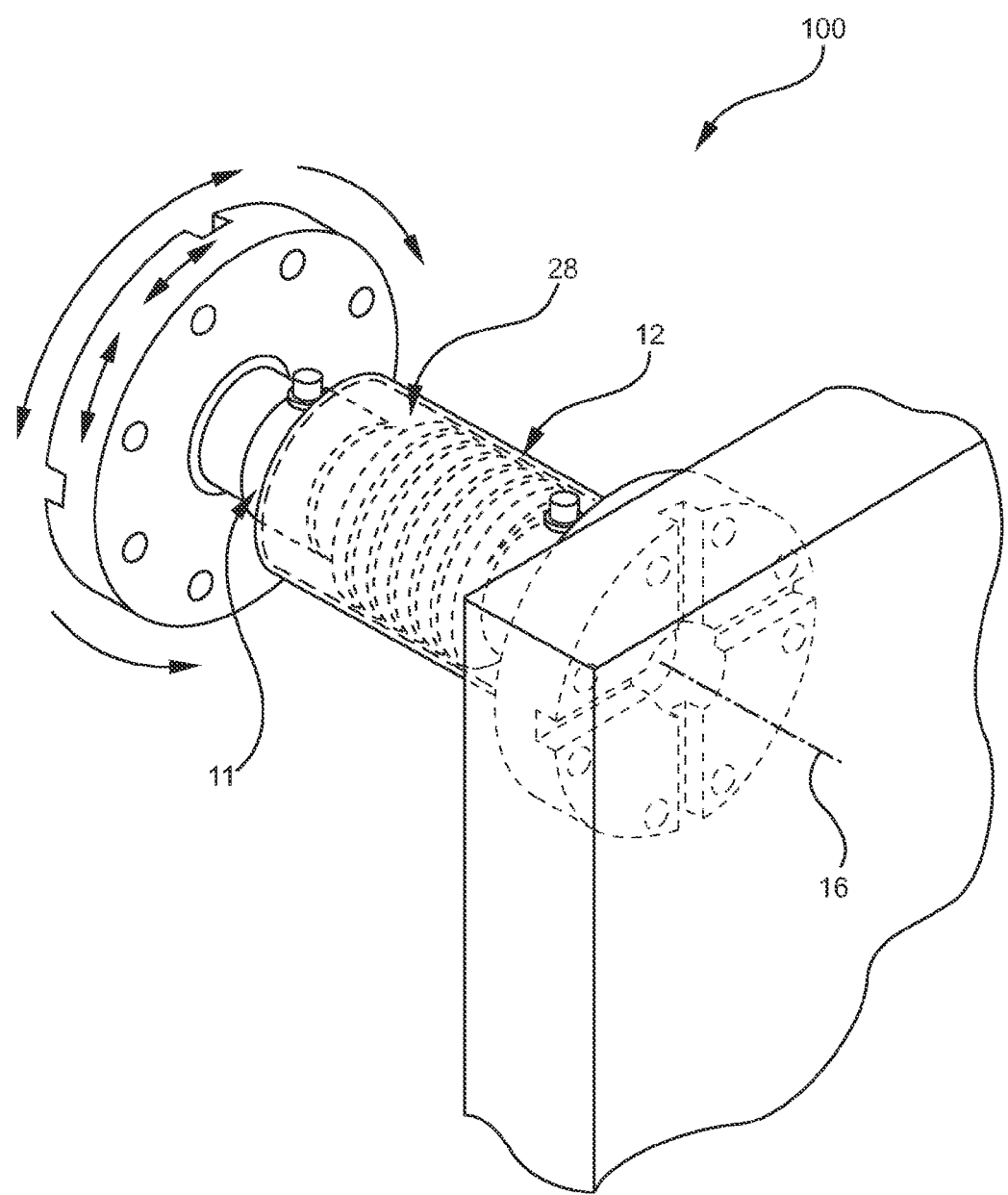
FIG. 9 shows a damper.
Figure 10:
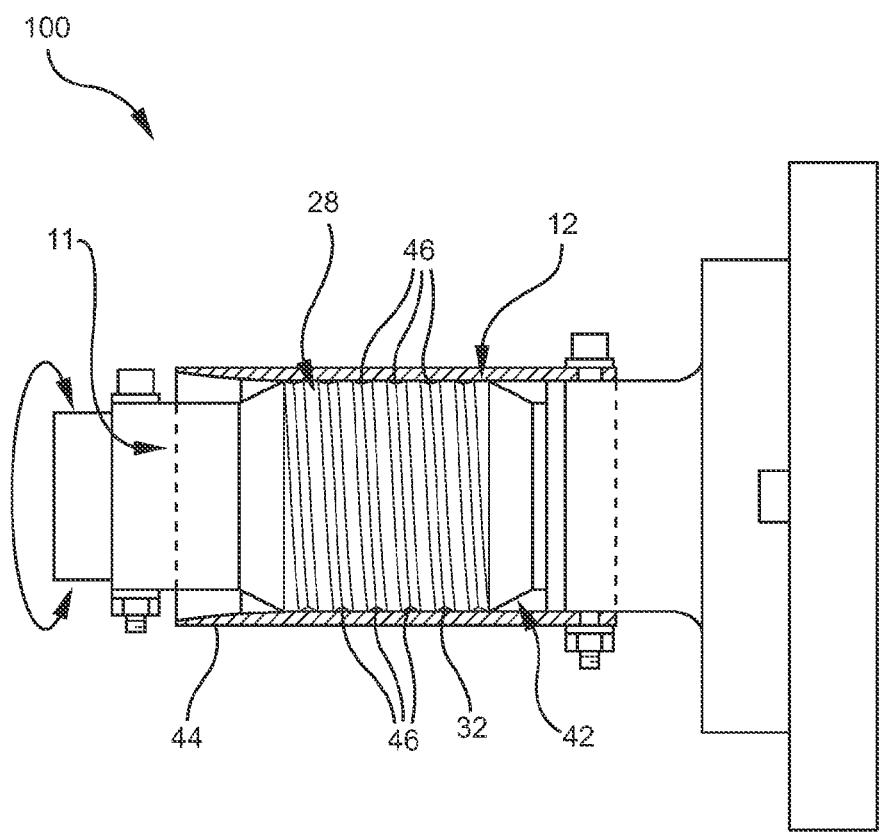
FIG. 10 shows a damper with a cut away portion.
Figure 11A:
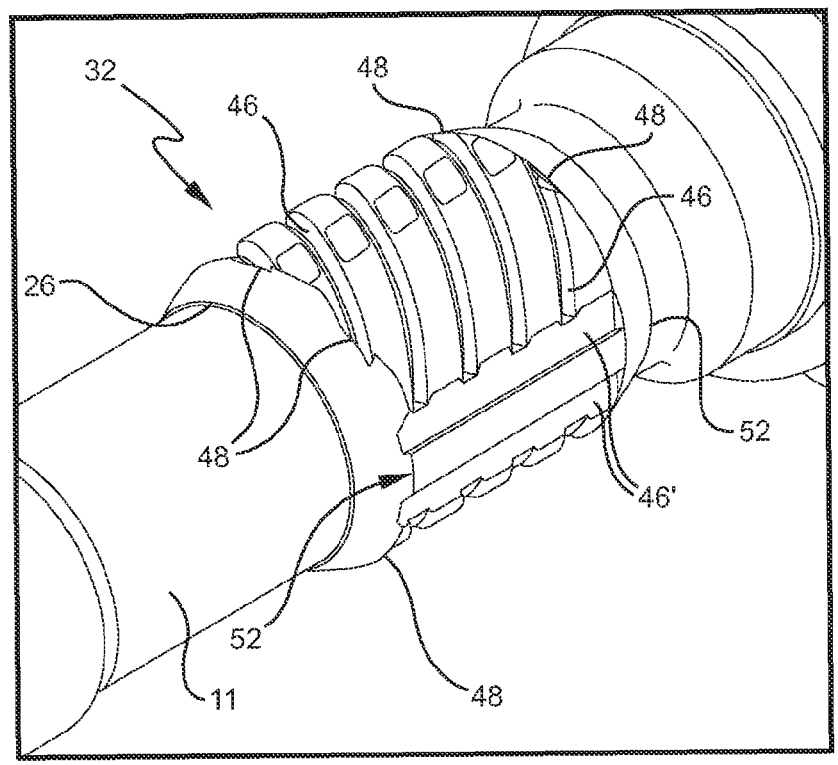
FIGS. 11A-F show dampers and damper components.
Figure 11B:
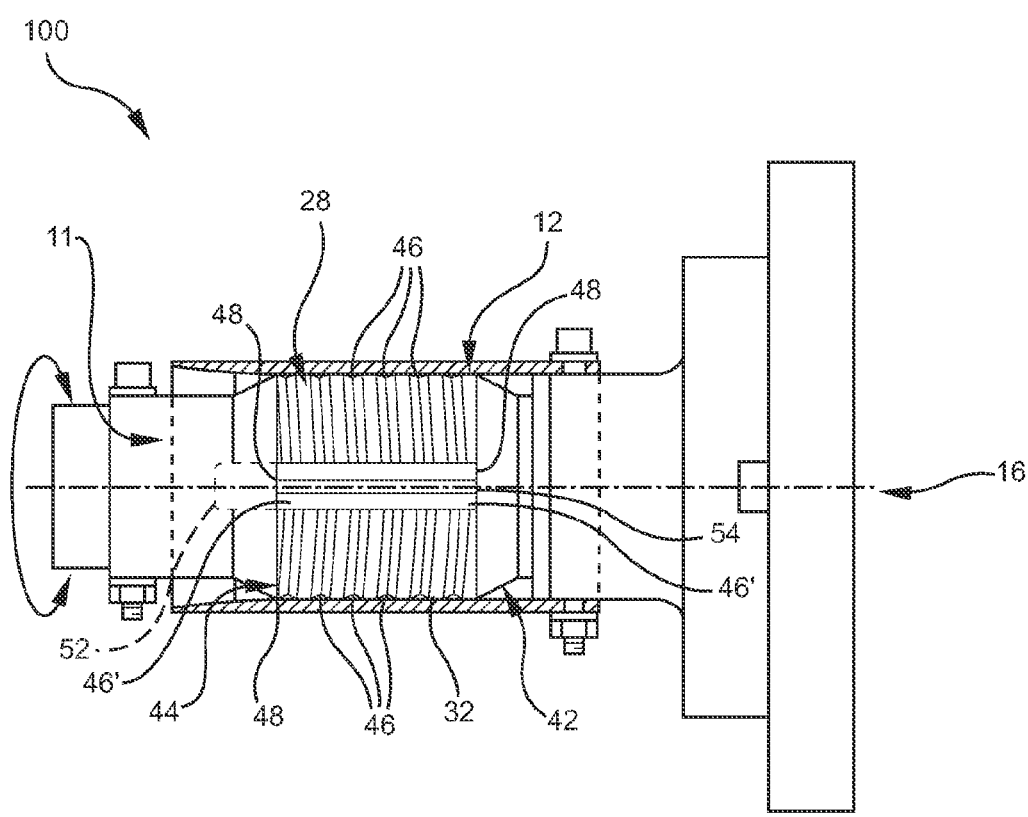
Figure 11C:
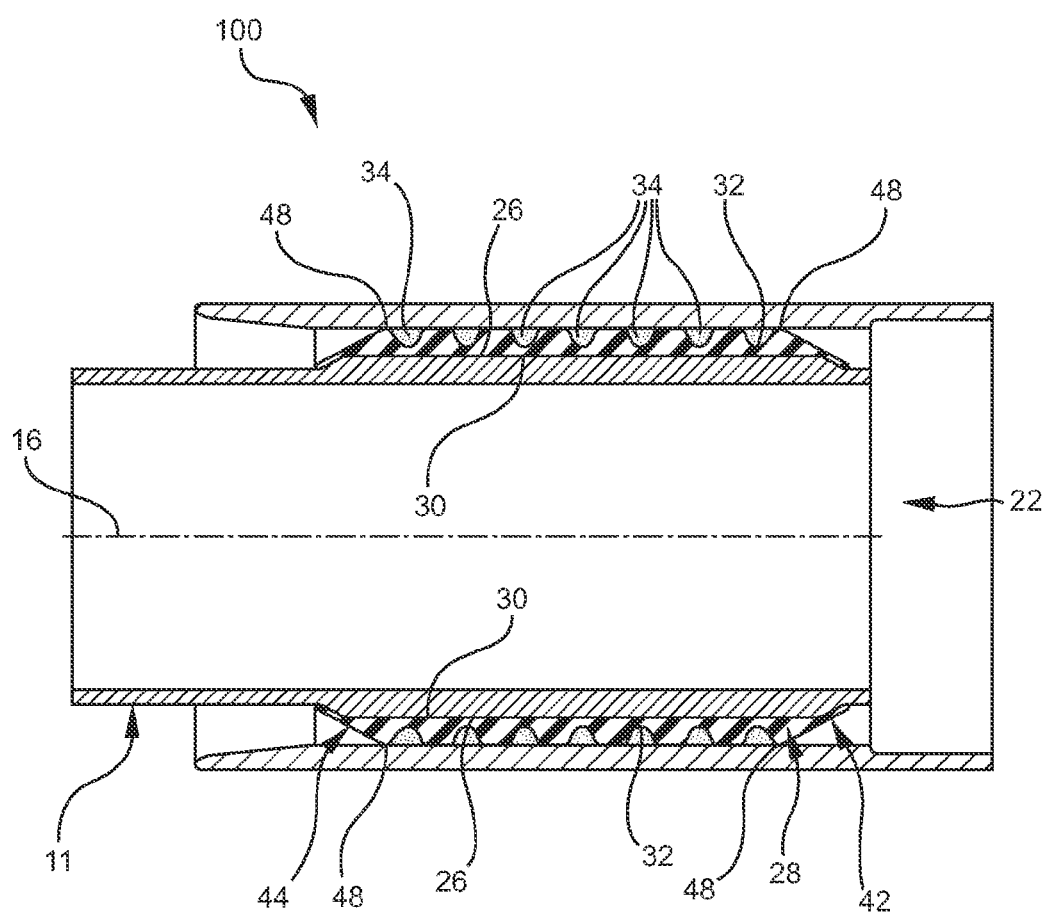
Figure 11D:
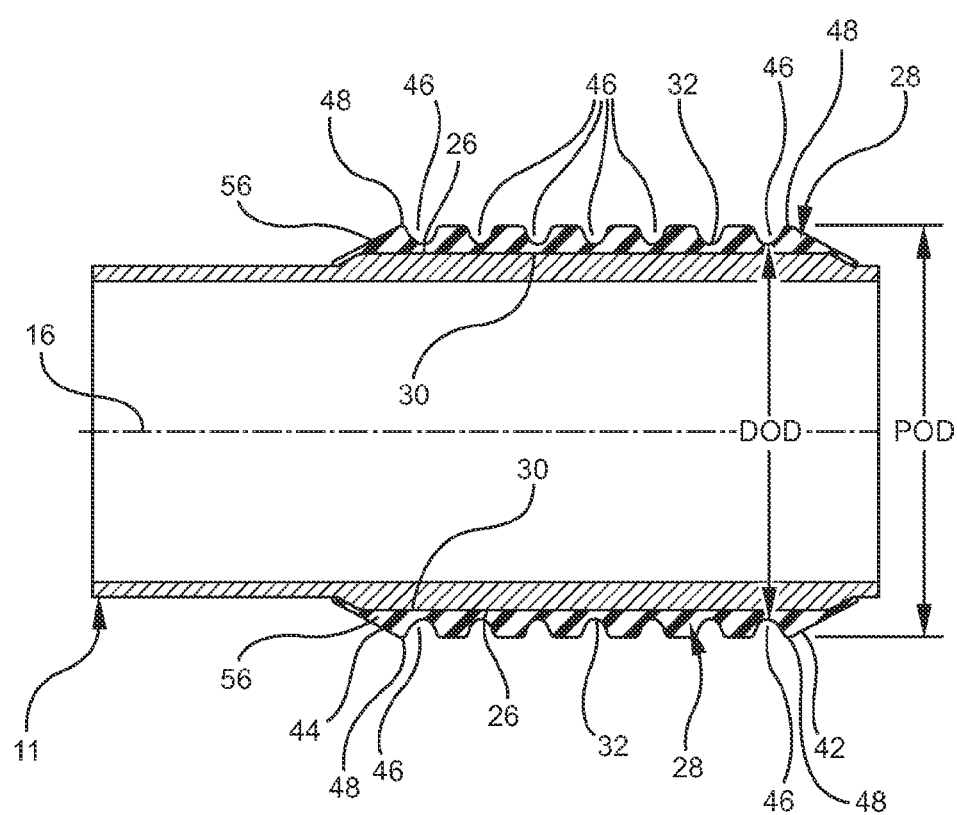
Figure 11E:
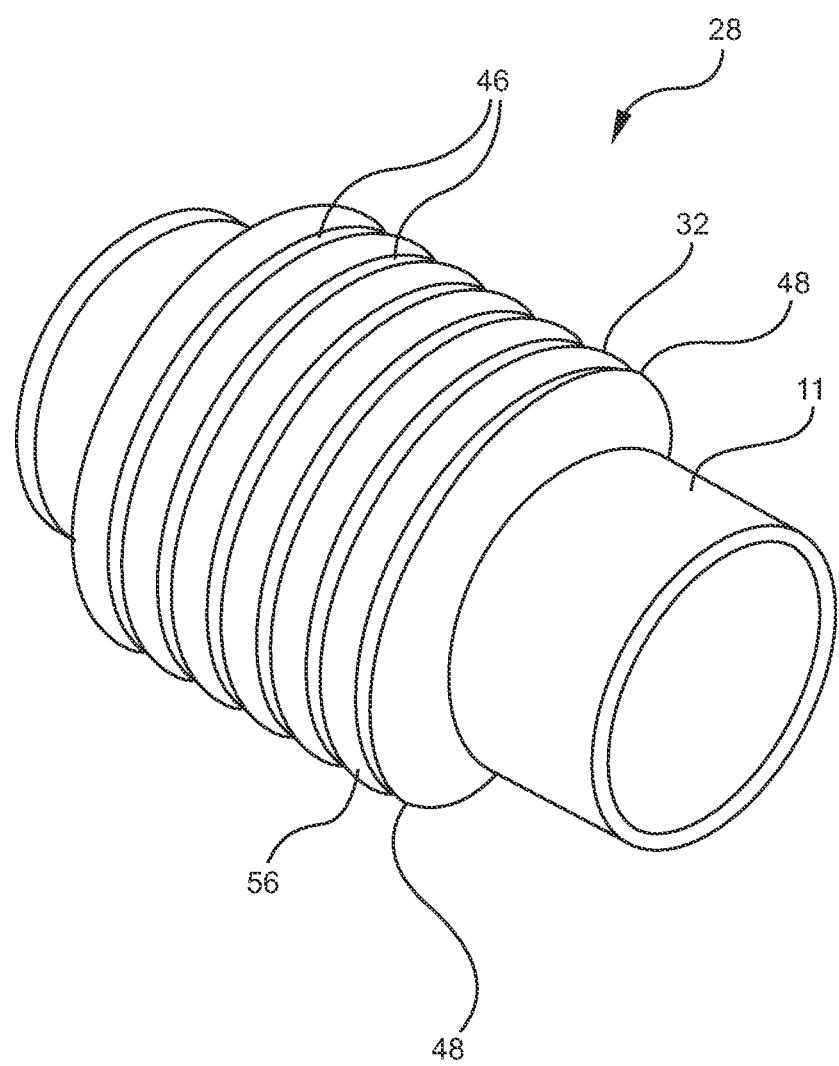
Figure 11F:
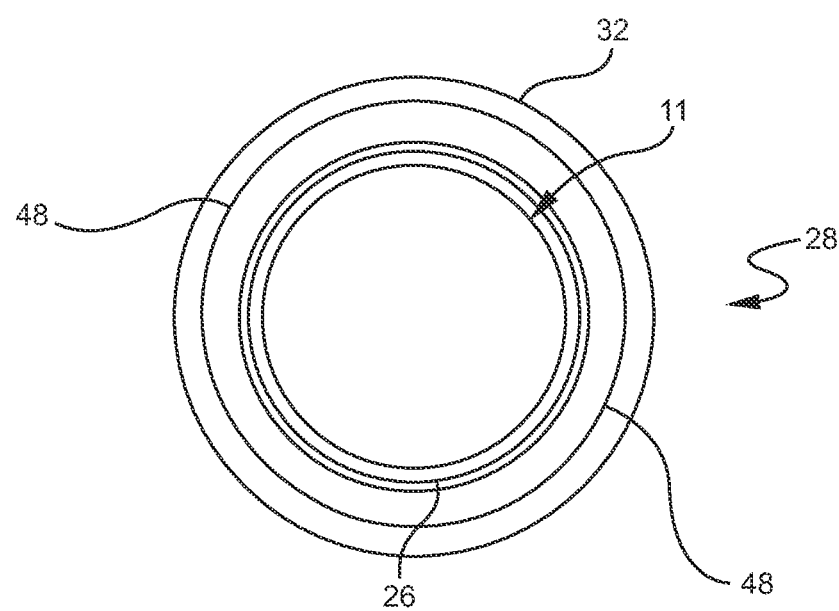

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention includes an aircraft vehicular front landing gear assembly 10 for an aircraft 20. The landing gear assembly 10 is comprised of a nonelastomeric outer upper strut shaft tubular member 12 having an inner axial center bore 22 with a tubular cylindrical frictional interface inner surface segment 24. Preferably the nonelastomeric outer upper strut shaft tubular member 12 is comprised of a metal tube. The landing gear assembly 10 is comprised of a nonelastomeric inner lower strut shaft tubular member 11 having an outer bonding cylindrical surface segment 26 with the nonelastomeric inner lower strut shaft member rotationally received in the outer strut member inner axial center bore 22 with the nonelastomeric inner strut member 11 rotatable within the outer strut member 12. Preferably the nonelastomeric inner strut member 11 is comprised of a metal tube. The landing gear assembly 10 is comprised of an elastomeric surface effect damper member 28 encompassing the nonelastomeric inner strut member outer bonding cylindrical surface segment 26. The elastomeric surface effect damper member 28 has an inner bonding cylindrical surface segment 30 and an outer grooved elastomer surface 32. The elastomeric surface effect damper inner bonding surface segment 30 is bonded to the nonelastomeric inner strut member outer bonding surface segment 26. The landing gear assembly 10 includes a surface effect lubricant 34, the surface effect lubricant 34 disposed between the elastomeric surface effect damper outer grooved elastomer surface 32 and the nonelastomeric outer strut member frictional interface inner surface segment 24 with the elastomeric surface effect damper outer grooved elastomer surface 32 engaging the nonelastomeric outer strut member frictional interface inner surface segment 24 and inhibiting an oscillating shimmy rotation 36 of the nonelastomeric inner lower strut shaft member 11. Preferably the nonelastomeric inner lower strut shaft member 11 is grounded to a front nose wheel 17 with the rotation of nonelastomeric inner lower strut shaft member 11 tied and fixed to the steering rotation of the wheel 17, with the front nose wheel 17 and the nonelastomeric inner lower strut shaft member 11 rotationally actuated by a steering input 38, such as with steering tubes 15, steering collar 14, torque link 13, lower strut 111 and the nonelastomeric outer upper strut shaft member 12 is rotationally fixed to an aircraft nose front 40 such as with upper strut 112. Nonelastomeric outer upper strut shaft member 12 is rotationally fixed in that it does not rotate with steering input 38 and/or the front nose wheel 17 that is being turned side to side to steer the aircraft, such as during taxing and ground maneuvers by the aircraft 20. Nonelastomeric outer upper member 12 is tied and fixed to the structure of the aircraft nose front 40 such as through rotationally fixed upper strut 112, with nonelastomeric inner lower member 11 rotating relative to outer upper member 12. Preferably the elastomeric surface effect damper member outer grooved elastomer surface 32 has an upper end 42 and a distal lower end 44 with an elastomer surface groove 46 traversing the elastomer surface from the upper end 42 to the distal lower end 44, most preferably with groove 46 traversing the elastomer surface from the upper end to the distal lower end with the pattern of a helical spiral. Preferably the elastomeric surface effect damper member outer grooved elastomer surface 32 includes a helical spiral elastomer surface groove 46. Preferably the elastomeric surface effect damper member outer grooved elastomer surface 32 includes an elastomer surface groove 46.

The invention includes a method of making an aircraft vehicular front landing gear assembly 10. The method includes providing a nonelastomeric metal outer upper strut shaft tubular member 12 having an inner axial center bore 22 with a tubular cylindrical frictional interface inner surface segment 24. The method includes providing a nonelastomeric metal inner lower strut shaft tubular member 11 rotationally receivable in the outer strut member inner axial center bore 22 with the nonelastomeric inner strut member 11 rotatable within the outer strut member 12, with the nonelastomeric inner strut member 11 having an outer bonding cylindrical surface segment 26. The method includes bonding an elastomeric surface effect damper member 28 to the nonelastomeric inner strut member outer bonding cylindrical surface segment 26, with the elastomeric surface effect damper member 28 having an outer grooved elastomer surface 32 distal from the nonelastomeric inner strut member outer bonding surface segment 26. The method includes rotationally receiving the nonelastomeric inner lower strut shaft rotationally receivable member 11 in the outer strut member inner axial center bore 22 with the nonelastomeric inner strut member 11 rotatable within the outer strut member 12 with the elastomeric surface effect damper outer grooved elastomer surface 32 engaging the nonelastomeric outer strut member frictional interface inner surface segment 24 and inhibiting an oscillating shimmy rotation 36 of the nonelastomeric inner lower strut member 11. Preferably the method includes molding the elastomeric surface effect damper member 28 onto the nonelastomeric inner strut member outer bonding cylindrical surface segment 26. Preferably the method includes providing an elastomeric surface effect damper member mold 60 for receiving the nonelastomeric inner strut member 11, providing an elastomer 56, and molding the elastomer 56 to the nonelastomeric inner strut member 11 inside the mold 60. Preferably the elastomer 56 is comprised of a natural rubber elastomer. In an embodiment the elastomer 56 is comprised of a silicone elastomer. Preferably the mold 60 includes an outer surface groove relief 62 distal from the nonelastomeric inner strut member outer bonding surface segment 26, preferably the groove relief 62 traversing the elastomer mold cavity surface to provide for a groove 46 traversing the elastomer surface from the upper end 42 to the distal lower end 44, preferably a helical spiral elastomer surface groove 46 from the upper end to the distal lower end. In an embodiment molding includes providing an elastomer transfer stock 57, and transferring the elastomer transfer stock 57 under a pressure into the mold 60, such as through a sprue with the mold comprising close fitting steel metal pieces clamped in place, and vulcanizing curing the elastomer 56 inside the mold 60 under a molding pressure, preferably a molding pressure of at least 1000 psi. Preferably providing the nonelastomeric outer upper strut shaft tubular member 12 includes providing a nonelastomeric outer tubular member 12 with a tubular cylindrical frictional interface inner surface segment 24 having an inside diameter ID, and bonding an elastomeric surface effect damper member to the nonelastomeric inner strut member outer bonding cylindrical surface segment includes bonding an elastomeric surface effect damper member 28 to the nonelastomeric inner strut member outer bonding surface segment 26 to provide a bonded elastomeric surface effect damper member 28 having an outer grooved elastomer surface 32 with an outside diameter OD, with the elastomeric surface effect damper member outer grooved elastomer surface outside diameter OD greater than the nonelastomeric outer upper strut tubular member frictional interface inner surface segment inside diameter ID. Preferably the inside diameter ID of nonelastomeric outer tubular member 12 and the unreceived surface effect damper outside diameter OD of surface effect damper member 28 have a ratio ID/OD≧0.75, preferably ID/OD≧0.80, preferably ID/OD≧0.85, preferably ID/OD≧0.90, preferably ID/OD≧0.92, most preferably ID/OD is in the range of 0.90 to 0.99, preferably with the surface effect damper elastomer having a compression strain less than 10%, prefer less than 8%, preferably less than 7.75% when received inside said nonelastomeric outer tubular member 12. Preferably the nonelastomeric outer tubular member 12 has a funnel end 23 with a progressively increasing inside diameter to facilitate reception of the nonelastomeric inner strut member 11 with surface effect damper member 28 inside outer tubular member 12. Preferably after reception of nonelastomeric inner strut member 11 with surface effect damper member 28 inside outer tubular member 12 the relative axial movement of nonelastomeric inner strut member 11 with surface effect damper member 28 along inner axial bore 22 is minimal in that relative axial stroking is minimized. The method includes providing a friction reducing lubricant 34 between the elastomeric surface effect damper outer grooved elastomer surface 32 and the nonelastomeric outer strut member frictional interface inner surface segment 24. Preferably a friction reducing lubricant grease is disposed between the surfaces, preferably a grease containing a fluorocarbon. Preferably the friction reducing lubricant 34 between the elastomeric surface effect damper outer grooved elastomer surface 32 and the nonelastomeric outer strut member frictional interface inner surface segment 24 is comprised of a silicone lubricant.

The invention includes method of making a shimmy damper 100 for damping a rotating oscillation 36. The method includes providing a nonelastomeric outer upper tubular member 12 having an inner axial center bore 22 with a tubular cylindrical frictional interface inner surface segment 24. The method includes providing a nonelastomeric inner lower shaft member 11 rotationally receivable in the outer member inner axial center bore 22 with the nonelastomeric inner member 11 rotatable within the outer member 12, with the nonelastomeric inner member 11 having an outer bonding cylindrical surface segment 26. The method includes bonding an elastomeric surface effect damper member 28 to the nonelastomeric inner member outer bonding cylindrical surface segment 26, with the elastomeric surface effect damper member 28 having an outer grooved elastomer surface 32 distal from the nonelastomeric inner member outer bonding cylindrical surface segment 26. The method includes rotationally receiving the nonelastomeric inner member 11 in the outer member inner axial center bore 22 with the nonelastomeric inner member 11 rotatable within the outer member 12 with the elastomeric surface effect damper outer grooved elastomer surface 32 engaging the nonelastomeric outer member frictional interface inner surface segment 24 and inhibiting an oscillating shimmy rotation 36 of the nonelastomeric inner member 11.

The invention includes a shimmy damper 100 for damping a rotating oscillation 36. The shimmy damper 100 is comprised of a nonelastomeric metal outer upper tubular member 12 having an inner axial center bore 22 with a tubular cylindrical frictional interface inner surface segment 24. The shimmy damper 100 is comprised of a nonelastomeric metal inner lower member 11 having an outer bonding cylindrical surface segment 26, the nonelastomeric inner member 11 rotationally received in the outer member inner axial center bore 22 with the nonelastomeric inner member 11 rotatable within the outer tubular member 12. The shimmy damper 100 is comprised of an elastomeric surface effect damper member 28 encompassing the nonelastomeric inner member outer bonding cylindrical surface segment 26, with the elastomeric surface effect damper member 28 having an inner bonding cylindrical surface segment 30 and an outer grooved elastomer surface 32. The elastomeric surface effect damper inner bonding cylindrical surface segment 30 is bonded to the nonelastomeric inner member outer bonding cylindrical surface segment 26. The shimmy damper 100 is comprised of a surface effect lubricant 34 disposed between the elastomeric surface effect damper outer grooved elastomer surface 32 and the nonelastomeric outer member frictional interface inner surface segment 24 with the elastomeric surface effect damper outer grooved elastomer surface 32 engaging the nonelastomeric outer member frictional interface inner surface segment 24 and inhibiting an oscillating shimmy rotation of the nonelastomeric inner member.

The invention includes a method of making a rotating oscillation damper 100 for damping a rotating oscillation 36. The method includes providing a nonelastomeric metal outer tubular member 12 having an inner axial center bore 22 with a tubular cylindrical frictional interface inner surface segment 24 and providing a nonelastomeric metal inner member 11 rotationally receivable in the outer member inner axial center bore 22 with the nonelastomeric inner member 11 rotatable within the outer member 12. The nonelastomeric inner member 11 has an outer bonding cylindrical surface segment 26, and the method includes providing an elastomeric surface effect damper member mold 60 for receiving the nonelastomeric inner member 11, with the mold including an outer surface groove relief 62 distal from the nonelastomeric inner member outer bonding cylindrical surface segment 26, preferably with the groove relief traversing the elastomer surface mold cavity from an upper end 42 to a distal lower end 44. Preferably the outer surface groove relief 62 has a helical spiral pattern for producing an elastomer surface groove 46. The method includes providing an elastomer 56 and molding the elastomer to the nonelastomeric metal inner member 11 inside the mold 60 to provide a an elastomeric surface effect damper member 28 bonded to the nonelastomeric inner member outer bonding cylindrical surface segment 26, with the elastomeric surface effect damper member 28 having an outer grooved elastomer surface 32 distal from the nonelastomeric inner member outer bonding cylindrical surface segment. The method includes receiving the nonelastomeric inner member 11 in the outer member inner axial center bore 22 with the nonelastomeric inner member 11 rotatable within the outer member 12 with the elastomeric surface effect damper outer grooved elastomer surface 32 engaging the nonelastomeric outer member frictional interface inner surface segment 24 and inhibiting an oscillating rotation 36 of the nonelastomeric inner member 11.

The invention includes an aircraft landing gear shimmy damper assembly 10 such as shown in FIG. 1-11. The assembly includes a nonelastomeric outer member 12 having an inner axial center bore 22 with a frictional interface smooth cylindrical inner surface segment 24. The aircraft assembly includes a nonelastomeric inner member 11 having an outer bonding surface segment 26. The nonelastomeric inner member 11 is rotationally received in the outer member inner axial center bore 22 with the nonelastomeric inner member 11 rotatable within the outer member 12. The assembly includes an elastomeric surface effect shimmy damper member encompassing the nonelastomeric inner member outer bonding surface segment 26, the elastomeric surface effect shimmy damper member including an elastomer having an inner bonding surface segment 30 and an outer grooved elastomer surface 32, the elastomeric damper inner bonding surface segment 30 is bonded to the nonelastomeric inner member outer bonding surface segment 26. The aircraft assembly includes a surface effect lubricant solid state nonliquid gel grease 34, the grease 34 disposed between the elastomeric damper outer grooved elastomer surface 32 and the nonelastomeric outer member frictional interface inner surface segment 24 with the elastomeric surface effect damper outer grooved elastomer surface 32 engaging the nonelastomeric outer member frictional interface inner surface segment 24 and inhibiting an oscillating shimmy rotation 36 of the nonelastomeric inner member 11 relative to the outer member 12 while preferably maintaining the grease 34 between the frictional interface smooth cylindrical inner surface segment 24 and the outer grooved elastomer surface 32. Preferably the friction reducing lubricant grease 34 between the elastomeric surface effect damper outer grooved elastomer surface 32 and the nonelastomeric outer strut member frictional interface inner surface segment 24 is a solid state nonliquid gel grease containing a fluorocarbon. Preferably the fluorocarbon gel grease is comprised of viscous grease thickened with PTFE. Preferably the grease 34 is comprised of a silicone lubricant, preferably a fluorocarbon gel silicone grease, preferably a grease including a PTFE and a dimethyl silicone. As shown in FIG. 11, preferably the outer grooved elastomer surface 32 surface retains grease proximate the frictional interface smooth cylindrical inner surface segment 24 with a plurality of grease dams 48 which inhibit the migration of grease 34 out of the frictional interface area of the outer elastomer surface 32 and the receiving interface smooth cylindrical surface segment 24. Preferably the outer grooved elastomer surface 32 includes a plurality of grease dams 48. The grease dams 48 are preferably formed with the outer elastomer surface 32 and control the flow of grease 34 to inhibit the migration of grease out through the upper and lower ends 42, 44 between the elastomer surface 32 and the frictional surface 24.

Preferably the outer grooved elastomer surface 32 includes a plurality of grease dams 48. As shown in FIG. 12, preferably the grooved elastomer surface 32 includes a plurality of grooves 46 terminating with grease dams 48, preferably with the grooved 46 comprised of helical groove segments that terminate at their ends proximate the upper and lower ends 42, 44 with grease dams 48 to control the flow of grease from exiting the groove at the upper and lower ends 42, 44. Preferably the plurality of surface grooves 46 end with grease dams 48. Preferably the surface grooves 46 are comprised of elastomer surface groove depression paths that end with a rising elastomer surface forming the grease dam 48. Preferably the grease dam is a raised elastomer radially extending outward and away from the inner bonding surface 30 and the inner member 11 to impede the flow of grease out of the groove 46.

Figure 12A:
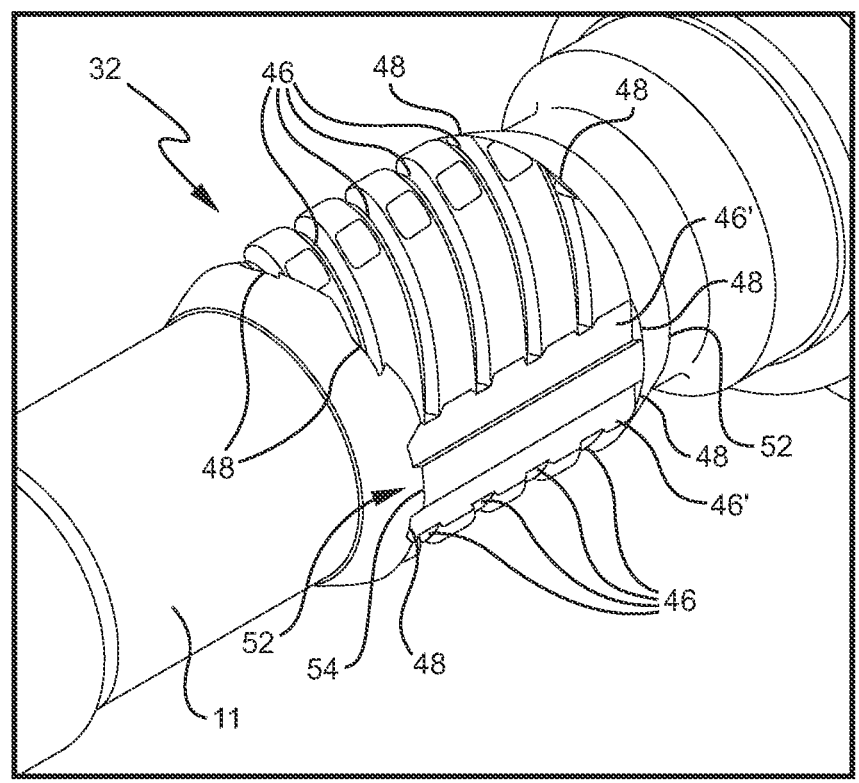
FIGS. 12A-M show inner member damper components, cross sections and details of such.
Figure 12B:
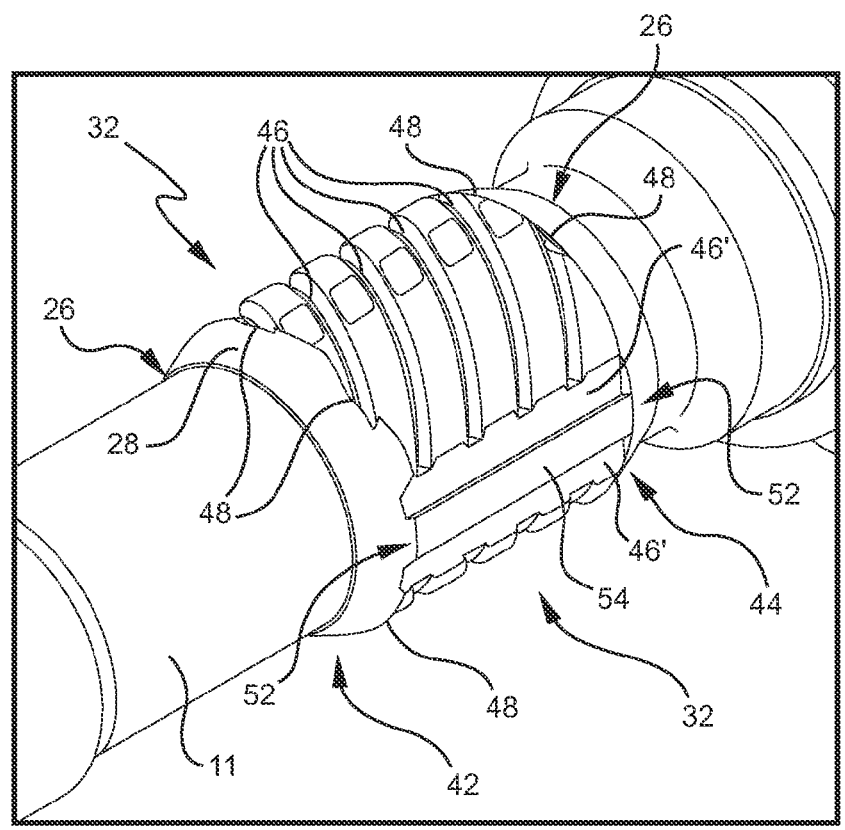
Figure 12C:
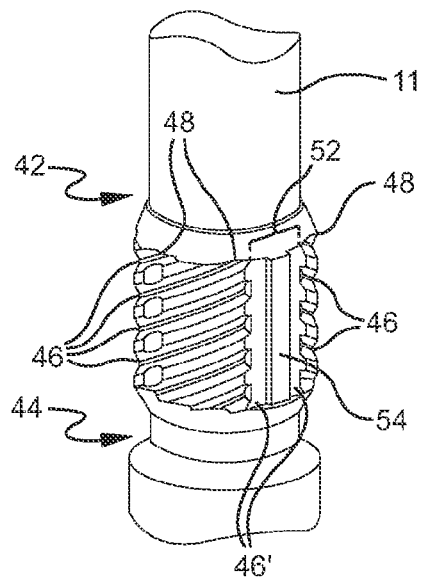
Figure 12D:
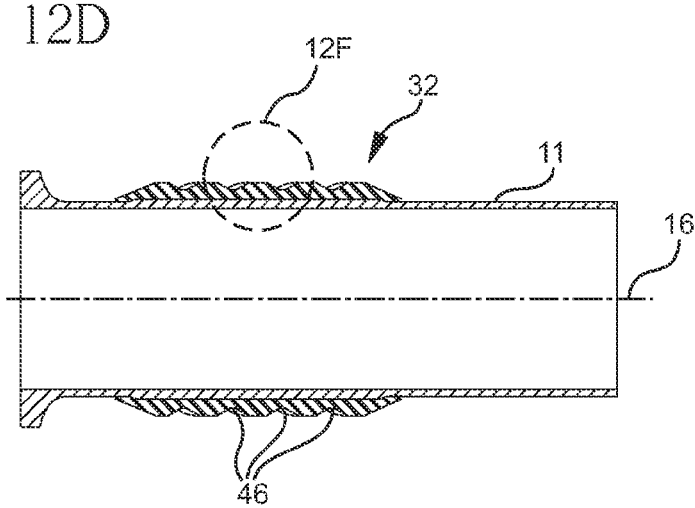
Figure 12E:
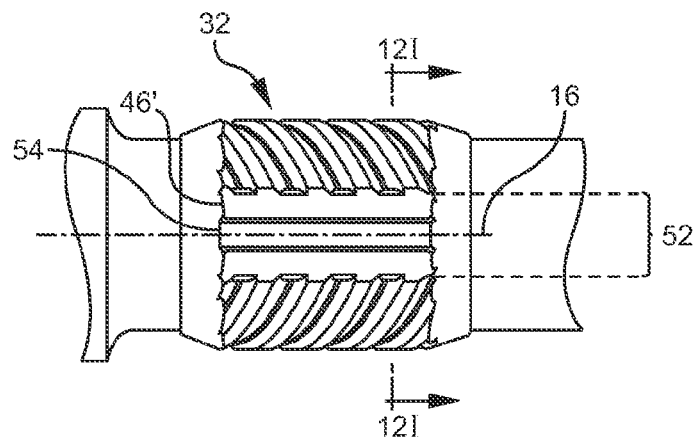
Figure 12F:
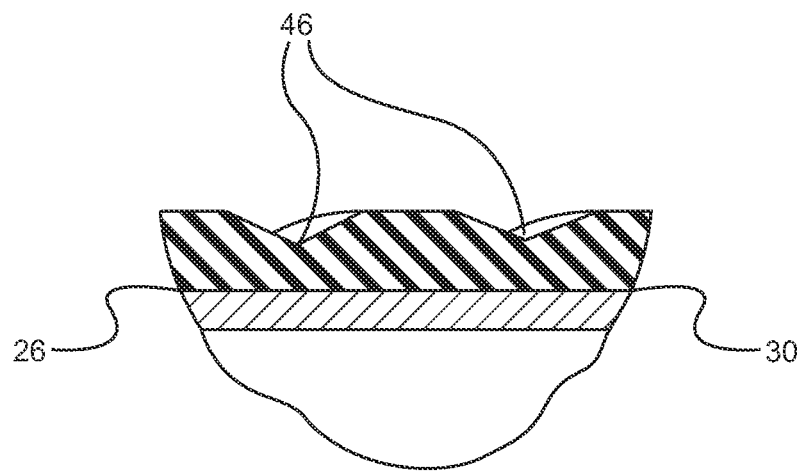
Figure 12G:
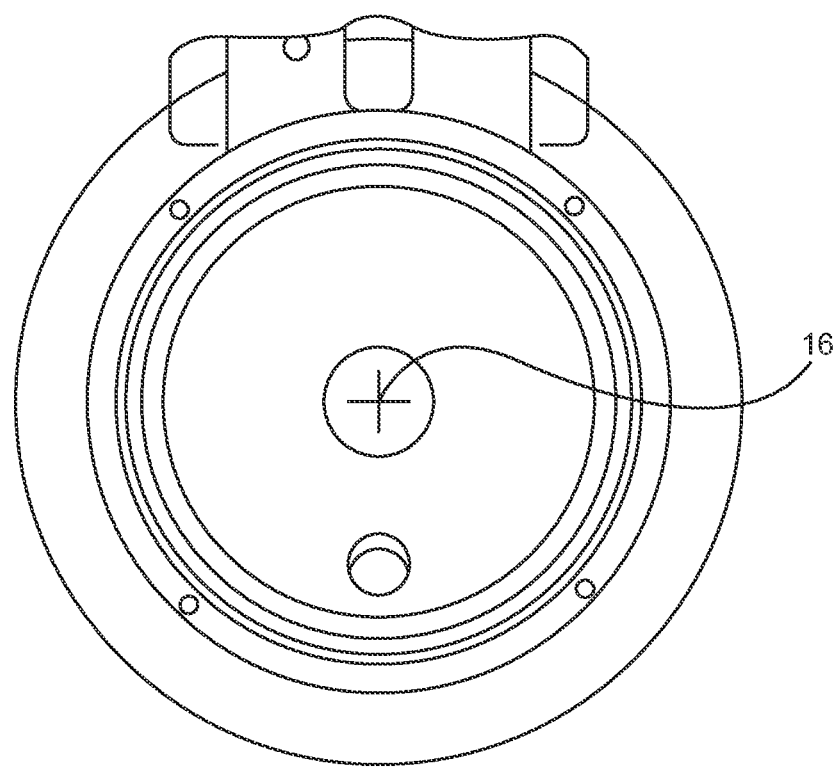
Figure 12H:
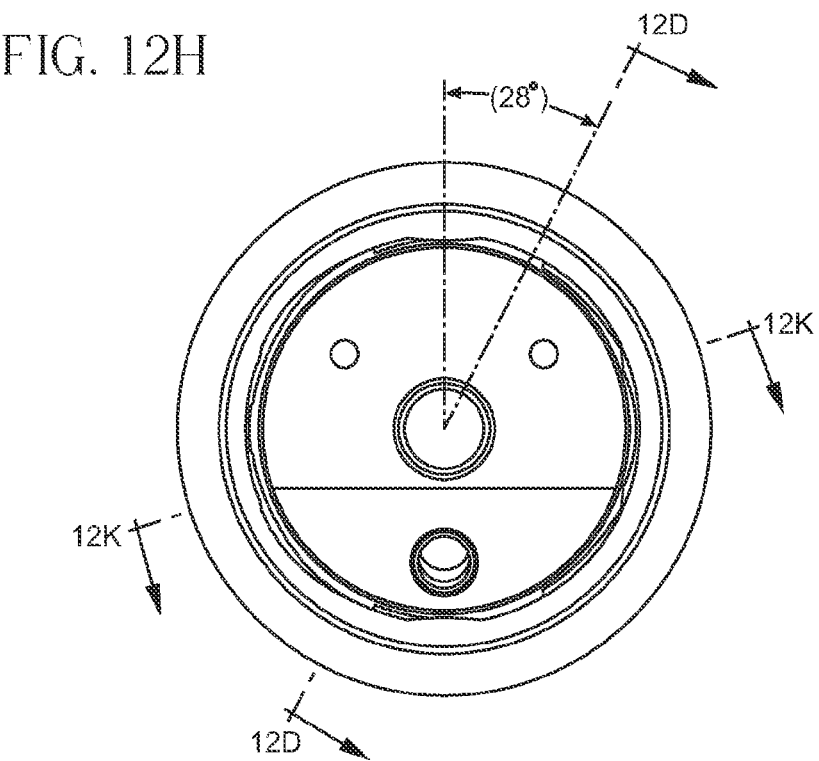
Figure 12I:
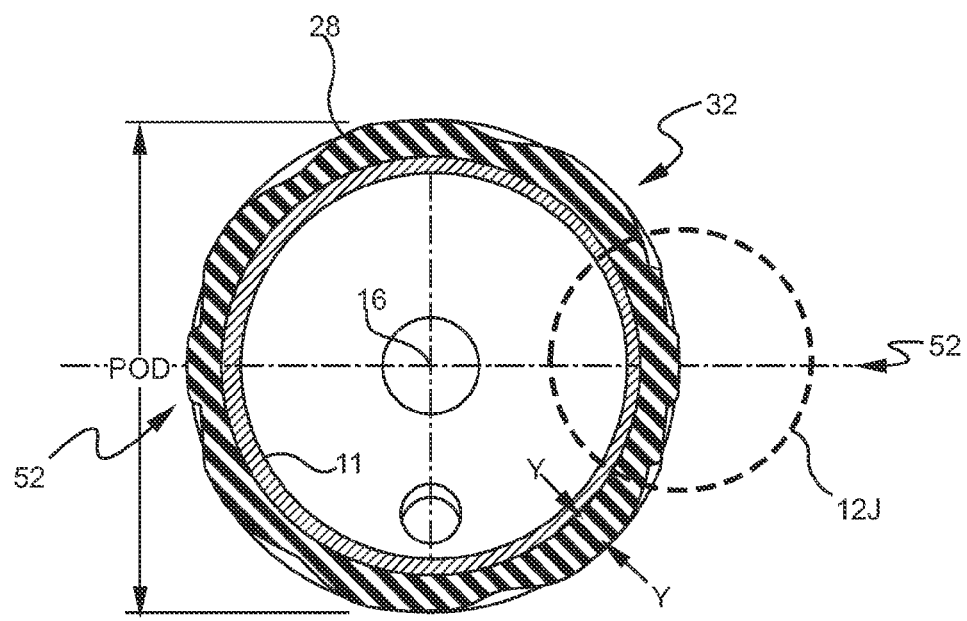
Figure 12J:
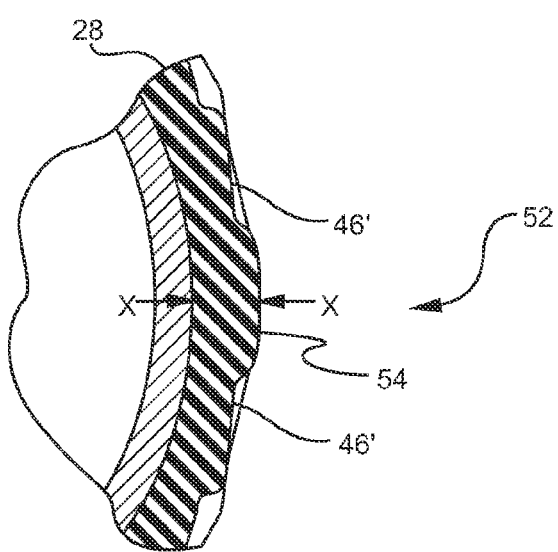
Figure 12K:
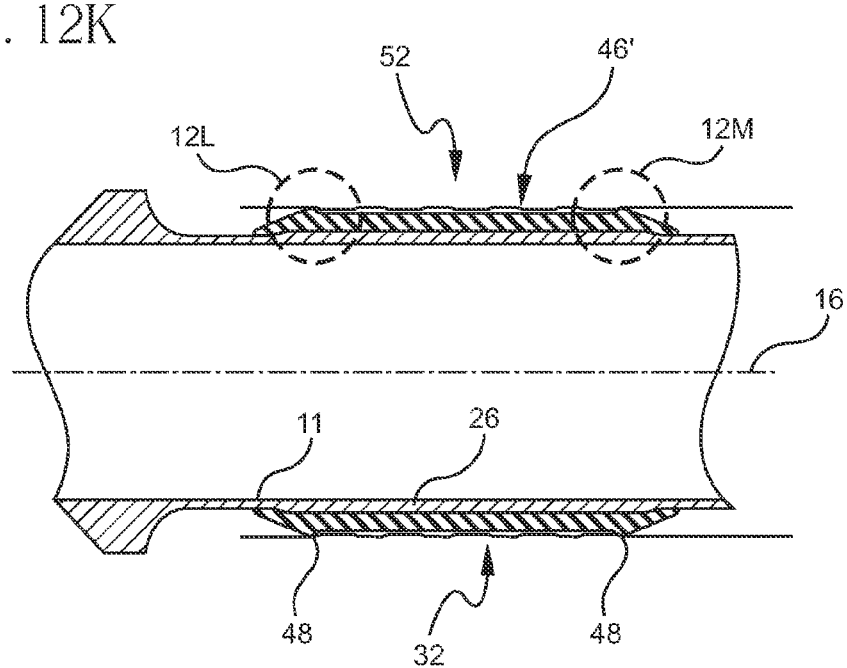
Figure 12L:
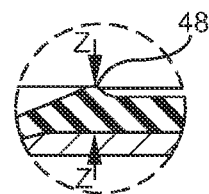
Figure 12M:
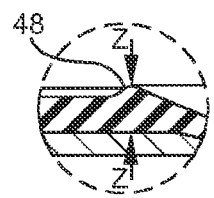
Figure 14:
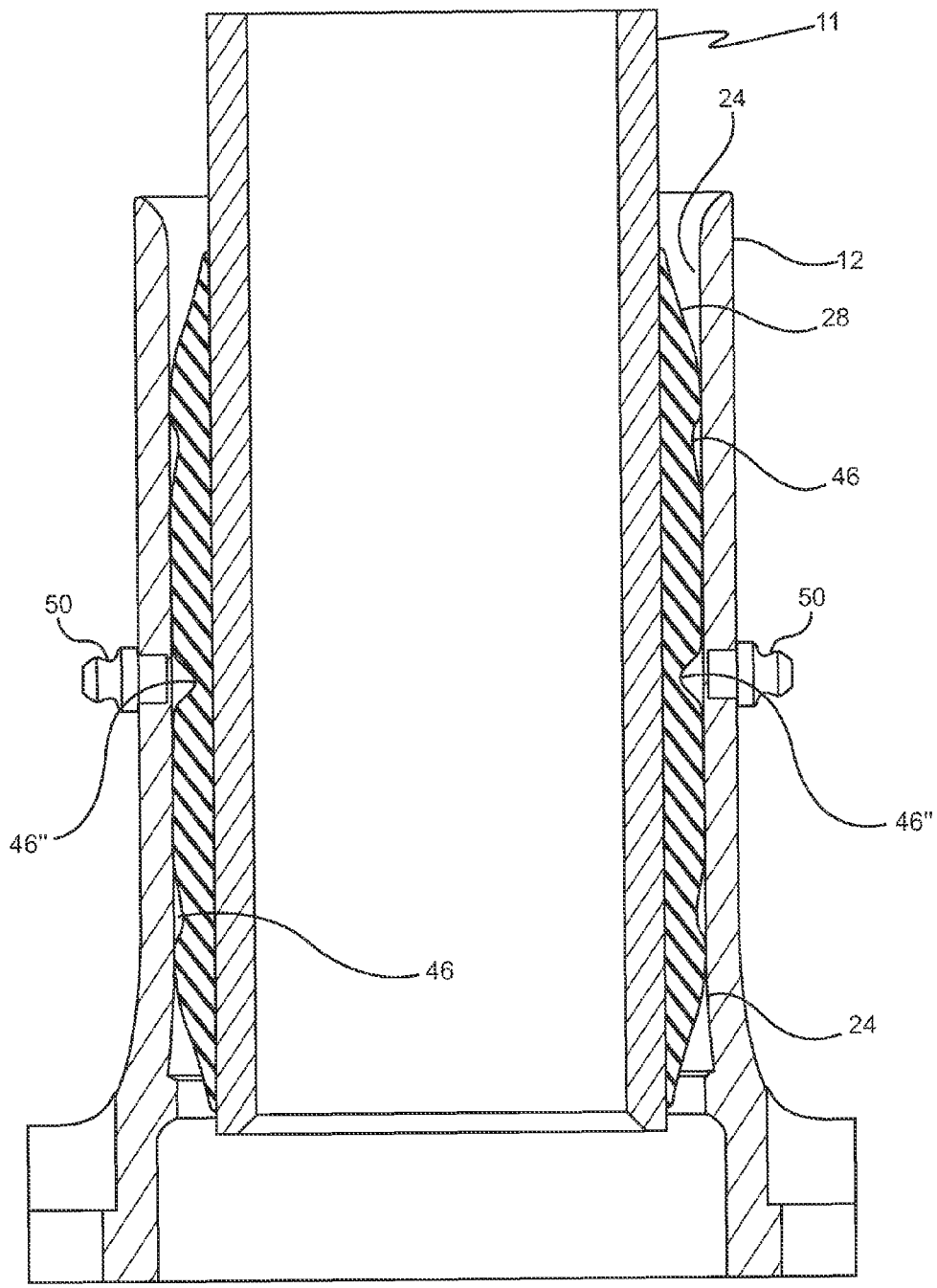
FIG. 14 shows a damper cross section.

Preferably the assembly outer grooved elastomer surface 32 has a first upper end 42 and a second distal lower end 44 with a plurality of grooves 46 between the first upper end 42 and the second distal lower end 44, preferably with grease dams 48 at the ends of the grooves 46, preferably with grease dams 48 proximate the upper end 42 and the distal lower end 44. Preferably the plurality of grooves 46 includes more than one helical groove 46. Preferably the plurality of grooves 46 are comprised of a plurality helical segments, preferably with the helical segments not completely circling the inner member 11. Preferably the helical grooves do not traverse all way from upper end 42 to lower end 44. Preferably the plurality of grooves 46 include at least one axial groove 46'. Preferably the plurality of grooves 46 include at least one circumferential groove 46". Preferably the elastomeric surface effect damper member outer grooved elastomer surface 32 has the upper end 42 and the distal lower end 44 with at least one axial mold flat 52 traversing the elastomer surface 32 from the upper end 42 to the distal lower end 44, preferably with the axial flat 52 including at least one axial groove 46'. Preferably the axial mold flat 52 traverses the elastomer surface from the first upper end 42 to the distal second lower end 44, preferably with the axial flat 52 including at least one flat axial surface groove 46' traversing the elastomer surface from the first upper end 42 to the second distal lower end 44. Preferably the multi grooved elastomer surface includes two axial mold flats 52 traversing the elastomer surface from the first upper end 42 to the second distal lower end 44 along the longitudinal center axis 16, preferably with the two axial mold flats 52 oppositely oriented, preferably about 180 degrees apart. Preferably grease dams 48 at the intersection of the axial flat 52 and the non-axial grooves (circumferential grooves and helical grooves) maintain grease 34 in the non-axial grooves. Preferably the two axial mold flats 52 include an axial flat raised plateau 54, preferably with the axial mold flat including the axial flat raised plateau 54 with a flat axial surface groove 46' on each side, with the axial mold flats 52 molded in the elastomer surface with the axial flat raised plateau surface area 54 surrounded by the axial groove depressions 46'. Preferably the outer grooved elastomer surface 32 includes at least one axial mold flat 52, preferably with a first and second axially running mold flats 52 separating the surface 32 into two halves, preferably two mirror image helical groove segment area halves with non-parallel helical groove orientations with opposite helical twists that would intersect if not for the axial flats 52 such as shown in FIG. 12E. Preferably, the helical groove segments have a helical groove pitch angle relative to the longitudinal axis 16 that is preferably less than eighty five degrees, preferably no greater than seventy nine degrees, preferably no greater than seventy one degrees, and most preferably about sixty degrees (60±10 degrees) such as shown in FIG. 12. Preferably the outer grooved elastomer surface 32 includes a plurality of elastomer surface grooves 46, 46' which terminate with raised elastomer dam grease obstructions 48 which radially extend outward and away from the inner bonding surface 30. Preferably the assembly includes a grease inlet for injecting grease 34 between the elastomer surface 32 and the frictional interface surface 24 after the nonelastomeric inner member 11 is received in the outer member inner axial center bore 22. As shown in FIG. 14, preferably grease inlet 50 is proximate and oriented with a circumferential surface groove 46". Preferably the assembly includes at least one grease dam 48 for retaining the grease 34. Preferably the grooved elastomer surface 32 includes a plurality of grooves and the grease dams, preferably with the grooves ending with grease dams. Preferably the elastomer surface groove depression paths end with a rising elastomer surface, preferably a raised elastomer radially extending outward and away from the inner member 11 to provide a grease dam 48 to control the flow of grease 34 out of the groove depression.

Figure 13:
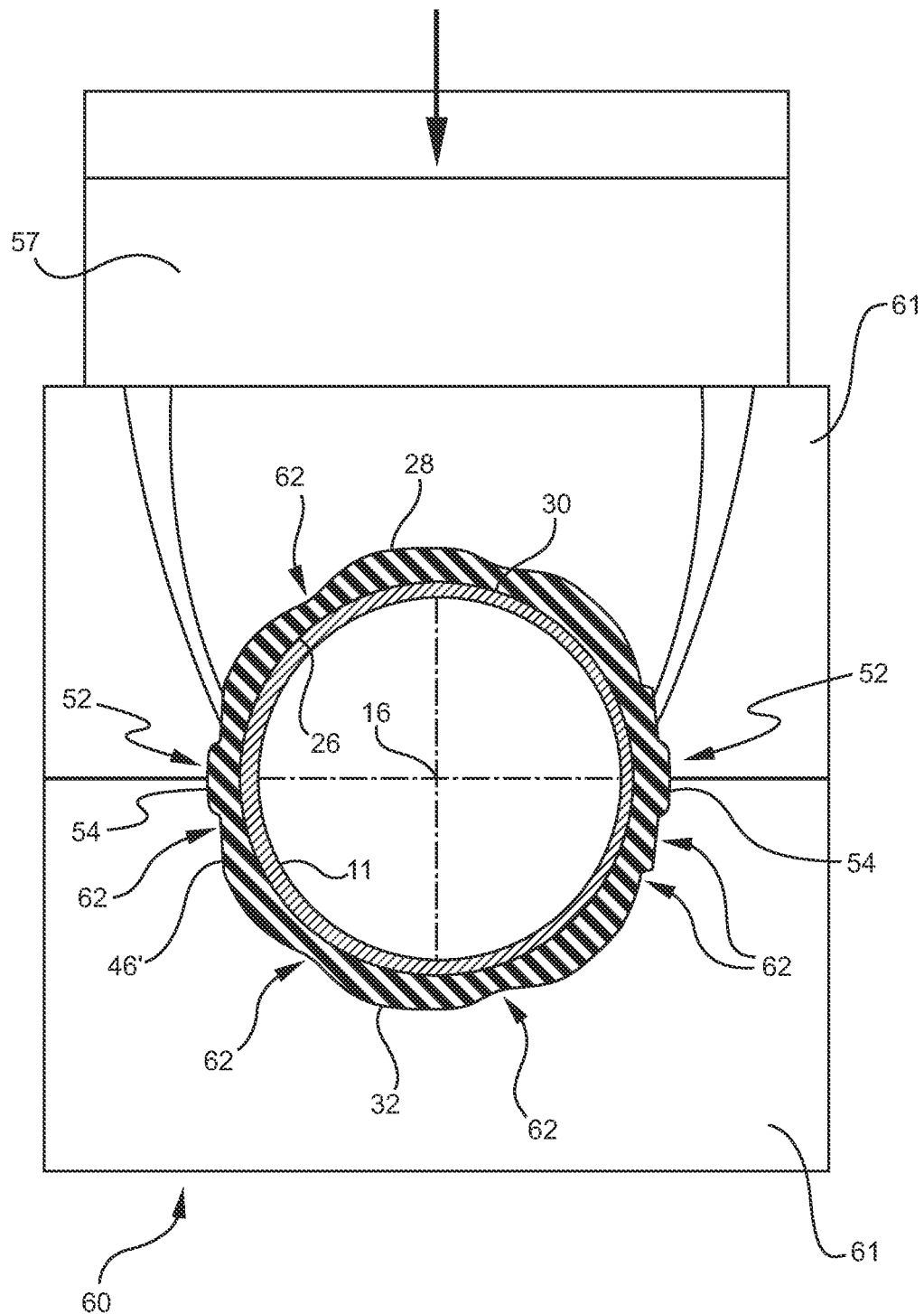
FIG. 13 shows molding an inner member damper component.
Figure 15A:
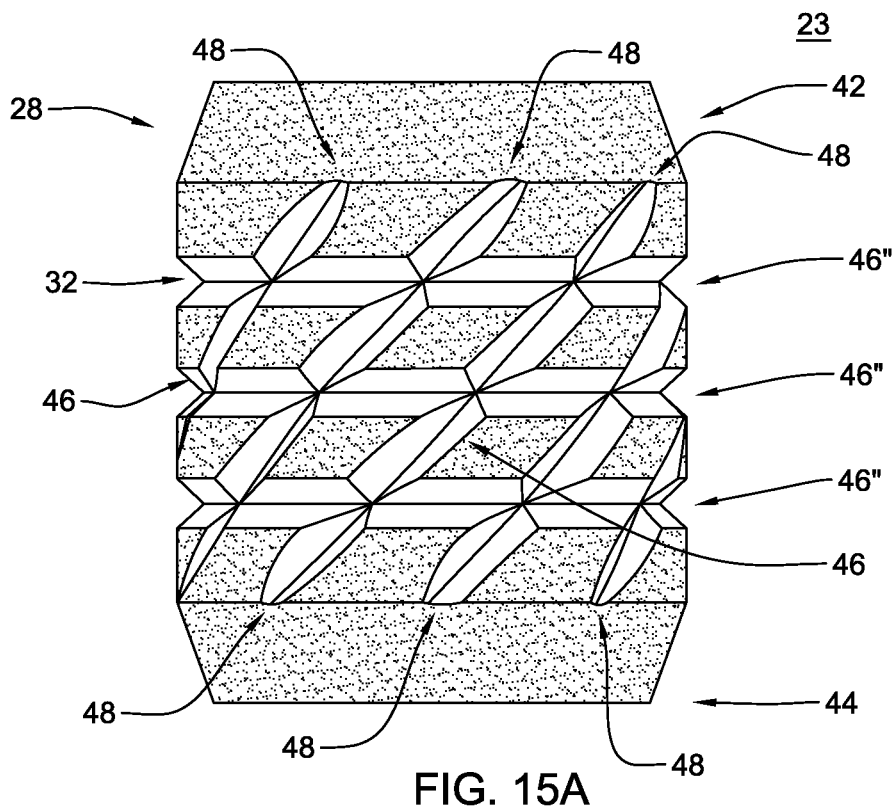
FIGS. 15A-B show an elastomer component.
Figure 15B:
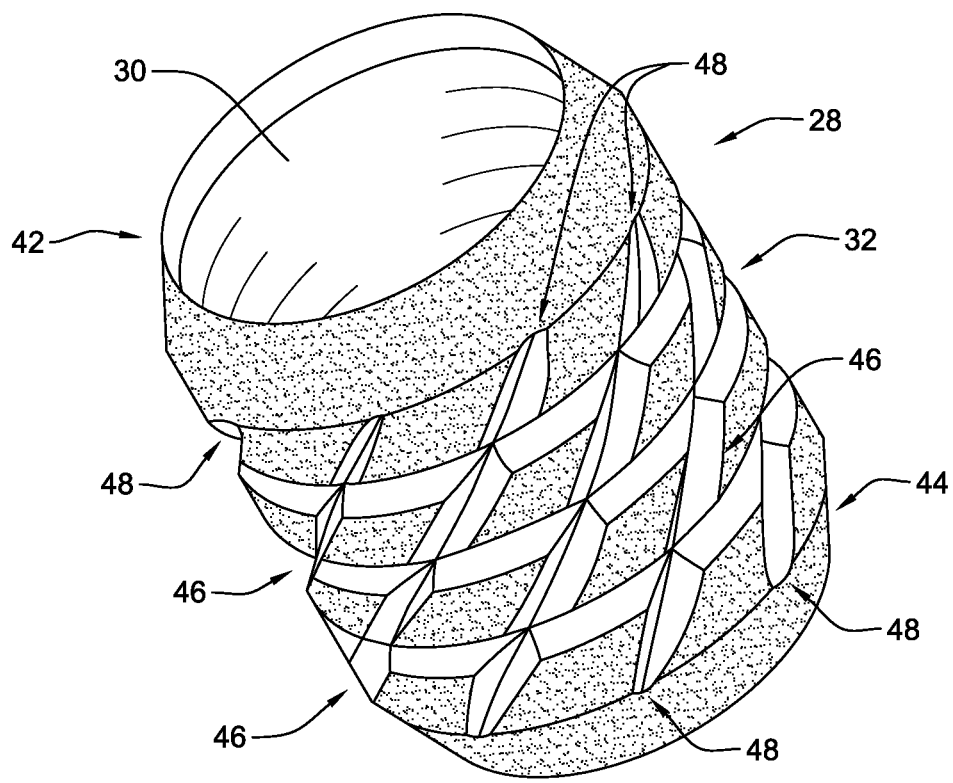
Figure 16A:
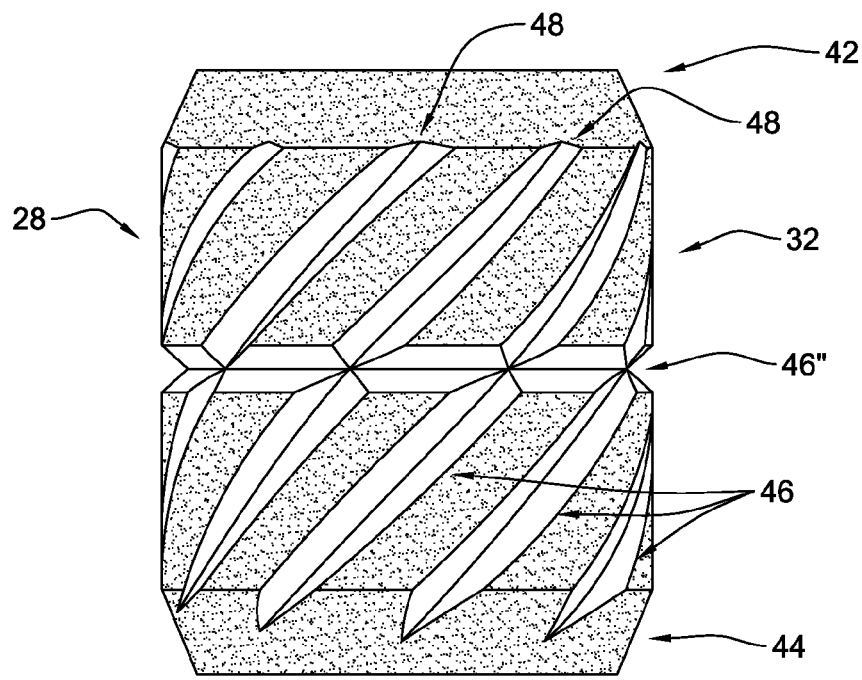
FIGS. 16A-B show an elastomer component.
Figure 16B:
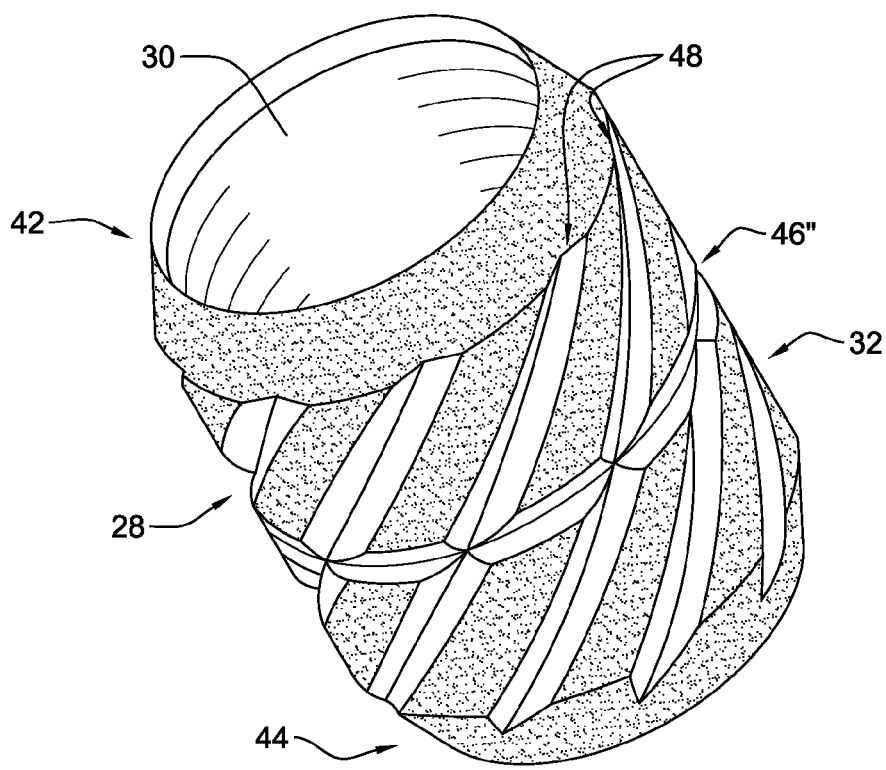
Figure 17B:
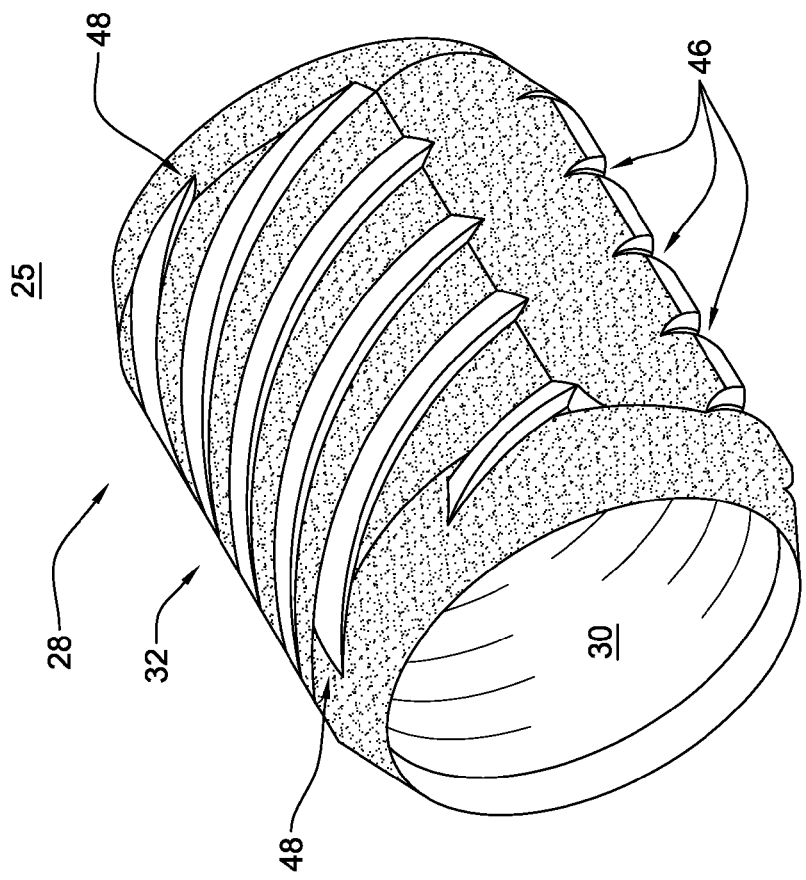
FIGS. 17A-B show an elastomer component.
Figure 17A:
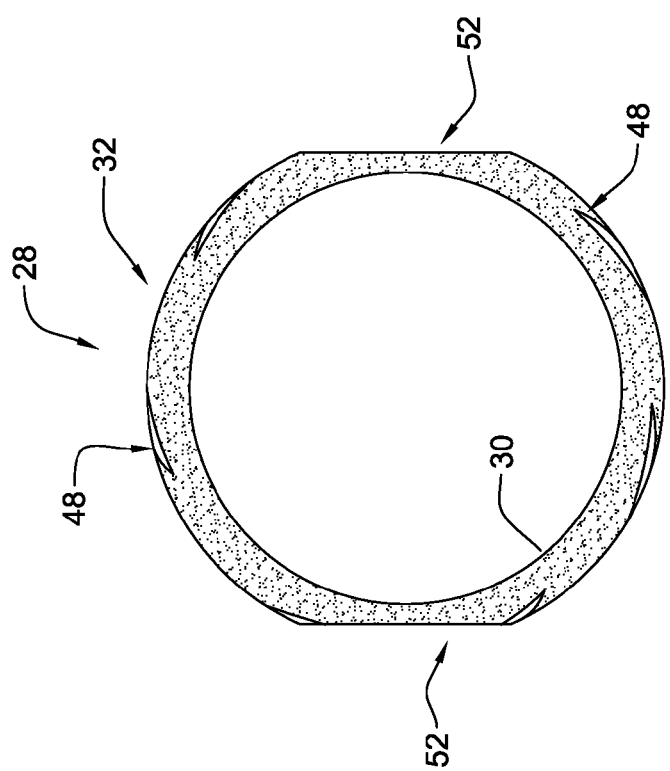
Figure 18B:
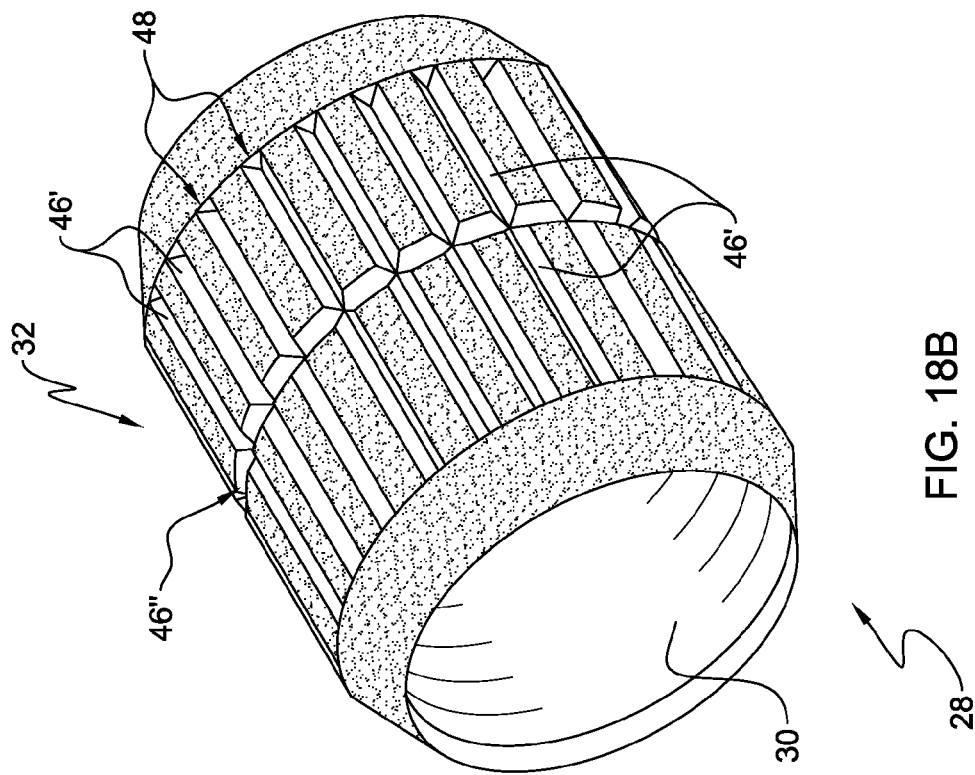
FIGS. 18A-B show an elastomer component.
Figure 18A:
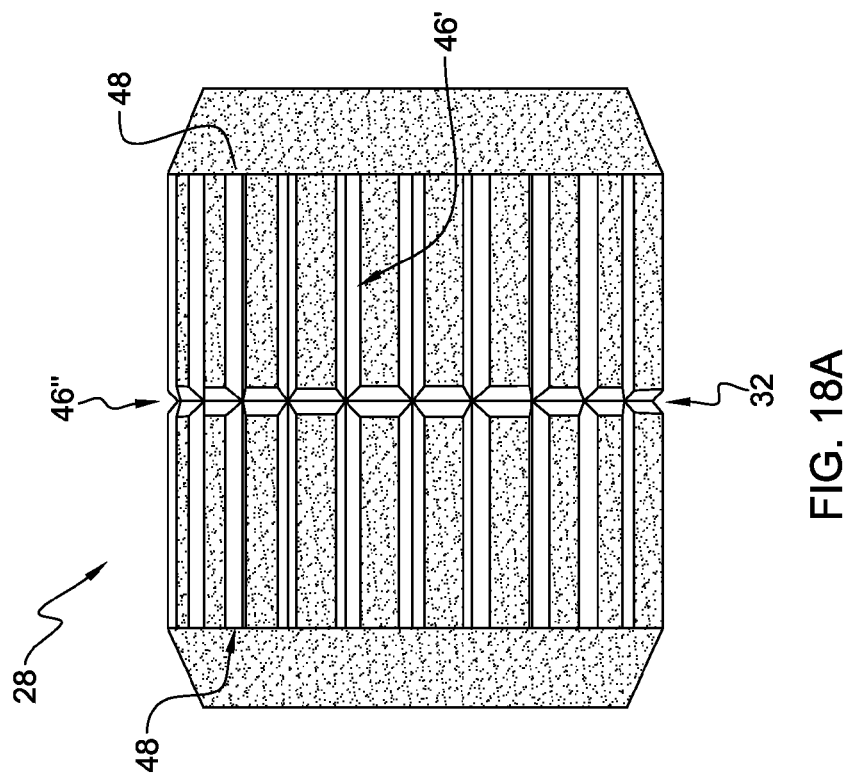

The invention includes a method of making an aircraft landing gear assembly. The method includes: providing a nonelastomeric outer member 12 having an inner axial center bore 22 with a frictional interface inner surface segment 24, and providing a nonelastomeric inner member 11 rotationally receivable in the outer member inner axial center bore 22 with the nonelastomeric inner member 11 rotatable within the outer member 12. Preferably the nonelastomeric inner member 11 has an outer bonding surface segment 26. The method includes bonding an elastomeric surface effect damper member elastomer 28 to the nonelastomeric inner member outer bonding surface segment 26, the elastomer 28 having an outer elastomer surface 32 distal from the nonelastomeric inner member outer bonding surface segment 26. The method includes receiving the nonelastomeric inner member 11 in the outer member inner axial center bore 22 with the nonelastomeric inner member 11 rotatable within the outer member 12 with the elastomer surface 32 engaging the nonelastomeric outer member frictional interface inner surface segment 24 and inhibiting an oscillating shimmy rotation of the nonelastomeric inner member 11 relative to the nonelastomeric outer member 12, preferably with the elastomer surface 32 including a plurality of grooves 46 with grease dams 48. Preferably the method includes molding the elastomer 28 onto the nonelastomeric inner member outer bonding surface segment 26 with the outer elastomer surface 32, preferably mold bonding the elastomer to the inner member 11 in an elastomer mold 60 while molding the outer elastomer surface 32 with the plurality of grooves 46 with grease dams 48. Preferably such as shown in FIG. 13, molding the elastomer 28 with the outer elastomer surface 32 include molding with at least one mold flat 52, preferably with two mold flats 52, most preferably with a two piece mold 60 with a first and second mold insert 61, preferably molding with no more than three mold inserts 61, most preferably only with two mold inserts 61 parted at the mold flats 52. Preferably the method includes providing the elastomer outer elastomer surface 32 with a plurality of grooves 46. Preferably the plurality of grooves 46 include more than one helical groove, preferably a plurality helical segments with the helical grooves not completely circling the inner member 11, preferably with the helical grooves not traversing all the way from the upper end 42 to lower end 44. Preferably the plurality of grooves 46 include at least one axial groove 46'. Preferably the plurality of grooves 46 include at least one circumferential groove 46". Preferably the method including providing a solid state nonliquid grease 34 and a plurality of grease dams 48 for controlling the flow of the grease 34 along the outer elastomer surface 32. Preferably the method includes providing a solid state nonliquid grease inlet 50, preferably through the outer member 12, and a solid state nonliquid grease 34, and injecting the grease 34 between the outer elastomer surface 32 and the frictional interface inner surface segment 24, preferably by injecting the grease through the grease inlet 50 after the inner member 11 is inserted into the outer member 12 with the outer elastomer surface 32 and frictional interface 24 engaging. Preferably the grease 34 is injected through the inlet 50 to a preferably circumferential grease receiving reservoir groove 46" after the inner member 11 is inserted into the outer member 12 with the outer elastomer surface 32 and frictional interface 24 engaged, with the grease dams 48 controlling the exiting of grease 34. Preferably providing the nonelastomeric outer member 12 includes providing a nonelastomeric outer member with a frictional interface inner surface segment 24 having an inside diameter ID, and bonding an elastomer 28 to the nonelastomeric inner member outer bonding surface segment 26 includes bonding an elastomeric surface effect damper member elastomer 28 to the nonelastomeric inner member outer bonding surface segment 26 to provide an elastomeric surface effect outer elastomer surface 32 with an elastomer groove projection outside diameter POD and an elastomer groove depression outside diameter DOD, with the outer elastomer surface outside diameter POD greater than the nonelastomeric outer member frictional interface inner surface segment inside diameter ID, and the DOD<ID with the bottom of grooves 46 less than ID of the outer member 12. Preferably the POD is comprised of the elastomer surface effect ribbed surface producing the resistive force to the relative rotation. Preferably the raised plateau 54 has an elastomer thickness X, the elastomer groove projection has an elastomer thickness Y, and the grease dam 48 has an elastomer thickness Z, preferably with Y>X and Y>Z. Preferably the provided elastomeric surface effect damper member elastomer 28 has an outer elastomer surface 32 with a plurality of grooves. Preferably the outer grooved elastomer surface 32 has a first upper end 42 and a second distal lower end 44 with a plurality of grooves 46 between the first upper end 42 and the second distal lower end 44, preferably with grease dams 48 at the ends of the grooves 46, preferably with grease dams 48 proximate the upper end 42 and the distal lower end 44. Preferably the plurality of grooves 46 includes more than one helical groove 46. Preferably the plurality of grooves 46 are comprised of a plurality helical segments, preferably with the helical segments not completely circling the inner member 11. Preferably the helical grooves do not traverse all the way from upper end 42 to lower end 44. Preferably the plurality of grooves 46 include at least one axial groove 46'. Preferably the plurality of grooves 46 include at least one circumferential groove 46". Preferably the elastomeric surface effect damper member outer grooved elastomer surface 32 has the upper end 42 and the distal lower end 44 with at least one axial mold flat 52 traversing the elastomer surface 32 from the upper end 42 to the distal lower end 44, preferably with the axial flat 52 including at least one axial groove 46'. Preferably the multi grooved elastomer surface includes two axial mold flats 52 traversing the elastomer surface from the first upper end 42 to the second distal lower end 44 along the longitudinal center axis 16, preferably with the two axial mold flats 52 oppositely oriented, preferably about 180 degrees apart. FIG. 15 shows an elastomeric surface effect damper member elastomer 28 with an outer elastomer surface 32 with a plurality of grooves including circumferential grooves 46" and helical segment grooves 46. FIG. 16 shows an elastomeric surface effect damper member elastomer 28 with an outer elastomer surface 32 with a plurality of grooves including a central middle grease receiving circumferential groove 46" and helical segment grooves 46. FIG. 17 shows an elastomeric surface effect damper member elastomer 28 with an outer elastomer surface 32 with a plurality of grooves including a helical segment grooves 46 and two opposingly oriented axial mold flats 52. FIG. 18 shows an elastomeric surface effect damper member elastomer 28 with an outer elastomer surface 32 with a plurality of grooves including axial grooves 46" and a central middle grease receiving circumferential groove 46". FIG. 19 shows an elastomeric surface effect damper member elastomer 28 with an outer elastomer surface 32 with a plurality of grooves including axial grooves 46" and a central middle grease receiving circumferential groove 46". Preferably the assembly provides for grease lubrication of the damper device after initial assembly and preferably at maintenance intervals. The damper device provides for entrapment of the lubricant grease 34 in the torsion damper device. The entrapment function is utilized for the assembly of the damper and maintenance grease filling with the grease dams 48 preventing the grease from migrating out of the frictional interface contact region of the damper. In a preferred embodiment the elastomer groove projection contact shape includes a rounded shape. FIGS. 15 and 16 show the grease dams 48 with the grooves. FIG. 15 shows three circumferential grooves and FIG. 16 only shows one. Preferably the central middle grease receiving circumferential groove 46" is oriented proximate a grease inlet 50. FIG. 14 shows an embodiment with the lubrication fittings grease inlet 50 installed on the outer member 12 with the bonded elastomer 28 inner member 11 inserted into the outer member 12. FIG. 17 shows an embodiment with axial mold flats. FIG. 18 shows an embodiment with axial grooves with dams and the central middle grease receiving circumferential lubrication groove 46". FIG. 19 shows an embodiment elastomer groove projection contact rounded shape that can be applied to both helical patterned and axial patterned grooves. The groove projection contact portion of the damper is completed round rather than a flatter arc portion that follows the arc length of the outer diameter. Preferably the assembly provides for lubricating the damper after assembly, retaining the grease in the elastomer grooves, and an axial groove structure that is parallel to the longitudinal center axis 16. FIGS. 15 and 16 show a circumferential groove 46" for receiving and transporting the grease from the entry point grease inlet 50 to the individual grooves and out along their respective lengths. The dams 48 at the end of the grooves retain the grease in the groove.

The invention includes the method of making the shimmy damper. The method includes providing the nonelastomeric outer tubular member 12 having an inner axial center bore 22 with a tubular cylindrical frictional interface inner surface segment 24. The method includes providing a nonelastomeric inner member 11 rotationally receivable in the outer member inner axial center bore with the nonelastomeric inner member 11 rotatable within the outer member 12. Preferably the nonelastomeric inner member 11 has an outer bonding cylindrical surface segment 26 and elastomer 28 bonded to the nonelastomeric inner member outer bonding cylindrical surface segment 26. Preferably the elastomer 28 has an outer elastomer surface 32 distal from the nonelastomeric inner member 11, the outer elastomer surface 32 including a plurality of grooves 46, 46', 46" and a plurality of grease dams 48. The method includes receiving the nonelastomeric inner member in the outer member inner axial center bore with the nonelastomeric inner member rotatable within the outer member with the elastomer surface 32 engaging the nonelastomeric outer member frictional interface inner surface segment 24 and inhibiting an oscillating shimmy rotation of the nonelastomeric inner member 11 relative to the outer member 12. Preferably the elastomer 28 is molded to the nonelastomeric inner member 11 with the outer elastomer surface 32 having two axial mold flats 52. Preferably the method includes providing a grease inlet 50 for injecting grease 34 after the nonelastomeric inner member 11 is received in the outer member inner axial center bore 22, and wherein the elastomer surface 32 includes a grease receiving groove, preferably a grease reservoir groove, with the grease inlet proximate the elastomer surface grease receiving groove, preferably circumferential groove 46" is proximate grease inlet 50, where grease 34 is injected after the elastomer surface 32 is contacting the tubular cylindrical frictional interface inner surface segment 24, preferably with the circumferential groove 46" intersecting non-circumferential grooves that have some axial component such as 46 and 46'. Preferably the outer elastomer surface 32 includes a plurality of helical grooves 46 terminating with grease dams 48, preferably with grease dams 48 at the upper and lower ends 42, 44 of surface 32, preferably with two axial mold flats 52 parting between two mirror image halves that have the helical groove patterns.

The invention includes shimmy damper 100 for damping a rotating oscillation. The shimmy damper includes of a nonelastomeric outer tubular member 12 having an inner axial center bore 22 with a tubular cylindrical frictional interface inner contiguous smooth surface segment 24, and a nonelastomeric inner member 11 having an outer bonding cylindrical surface segment 26, the nonelastomeric inner member 11 rotationally received in the outer member inner axial center bore 22 with the nonelastomeric inner member rotatable within the outer member. The damper includes an elastomer 28 between the inner and outer members, preferably encompassing the nonelastomeric inner member outer bonding surface segment, the elastomer 28 preferably having an inner bonding surface segment 30 and an outer grooved elastomer surface 32, the elastomer inner bonding surface segment 30 bonded to the nonelastomeric inner member outer bonding surface segment. The damper preferably includes a grease 34, the grease 34 disposed between the outer grooved elastomer surface 32 and the nonelastomeric outer member frictional interface inner surface segment 24 with the outer grooved elastomer surface 32 engaging the nonelastomeric outer member frictional interface inner surface segment 24 and inhibiting an oscillating shimmy rotation of the nonelastomeric inner member. Preferably the elastomer includes a plurality of grooves, preferably with grease dams 48, preferably with the grooves including at least one groove type chosen from helical segments grooves 46, axial grooves 46', and circumferential grooves 46". Preferably the elastomer 28 includes at least one mold axial flat 52, preferably two mold flats 52, which preferably provide mirror image surface halves. Preferably the damper includes a grease inlet 50 for injecting grease 34 after insertion of the inner member 11 in the outer member 12.

The invention includes a method of making a rotating oscillation damper 100. The method includes providing a nonelastomeric outer tubular member 12 having an inner axial center bore 22 with a tubular cylindrical frictional interface inner smooth surface segment 24. The method includes providing a nonelastomeric inner member 11 rotationally receivable in the outer member inner axial center bore 22 with the nonelastomeric inner member 11 rotatable within the outer member 12. Preferably the nonelastomeric inner member 11 having an outer bonding surface segment 26, and providing an elastomer mold 60 for receiving the nonelastomeric inner member 11, the mold 60 including a mold flat 52 and an outer surface groove relief 62 distal from the nonelastomeric inner member outer bonding surface segment 26, and providing an elastomer 57 and molding the elastomer to the nonelastomeric inner member 11 inside the mold 60 to provide an elastomer damper member bonded to the nonelastomeric inner member outer bonding surface segment, with the elastomer damper member having a multi-outer grooved elastomer surface 32 distal from the nonelastomeric inner member outer bonding surface segment. The invention includes receiving the nonelastomeric inner member 11 in the outer member inner axial center bore 22 with the nonelastomeric inner member rotatable within the outer member with the damper outer multigrooved elastomer surface 32 engaging the nonelastomeric outer member frictional interface inner surface segment 24 and inhibiting a relative rotation of the nonelastomeric inner member 11 relative to the outer member 12.

The invention includes a method of making a rotating oscillation damper 100, the method includes providing a nonelastomeric outer tubular member 12 having an inner axial center bore 22 with a tubular cylindrical frictional interface inner surface segment 24. The method includes providing a nonelastomeric inner member 11 rotationally receivable in the outer member inner axial center bore 22 with the nonelastomeric inner member 11 rotatable within the outer member 12, the nonelastomeric inner member having an outer bonding cylindrical surface segment 26. The method includes bonding an elastomer damper member 28 to the nonelastomeric inner member 11 with the elastomer 28 having an outer elastomer surface 32 distal from the nonelastomeric inner member, the outer elastomer surface 32 including at least one grease dam 48. The method includes receiving the nonelastomeric inner member 11 in the outer member inner axial center bore 22 with the nonelastomeric inner member rotatable within the outer member with the elastomer damper outer elastomer surface 32 engaging the nonelastomeric outer member frictional interface inner surface segment 24. The method includes providing a grease 34, disposing the grease 34 between the elastomer damper outer elastomer surface 32 and the nonelastomeric outer member frictional interface inner surface segment 24, preferably with the grease dams 48 containing the grease 34. Preferably the grease 34 is injected through an inlet 50 after receiving the inner member 11 in the outer member 12, preferably with periodic injection of grease 34 during use of the damper. The elastomer 28 inhibits an oscillating rotation of the nonelastomeric inner member 11 relative to the outer member 12.

The invention includes a rotation damper 100 for damping a rotating motion. The damper includes a nonelastomeric outer tubular member 12 and a nonelastomeric inner member 11. The damper includes a tubular cylindrical frictional interface contiguous smooth surface segment 24 and a bonding cylindrical surface segment 26. The nonelastomeric inner member 11 is rotationally received in the outer member 12 with the nonelastomeric inner member 11 rotatable within the outer member 12. The damper includes an elastomer 28 encompassing the nonelastomeric inner member 11, with the elastomer 28 between the inner member 11 and the outer member 12 with the elastomer 28 bonded to bonding cylindrical surface segment 26, with the elastomer 28 having a grooved elastomer surface 32 contacting and engaging the tubular cylindrical frictional interface contiguous smooth surface segment 24. The grooved elastomer surface 32 includes a plurality of grooves with grease dams 48. The damper includes a grease 34, the grease 34 disposed in the grooves and between the grooved elastomer surface 32 and the nonelastomeric member frictional interface surface segment 24 with the grooved elastomer surface 32 engaging the nonelastomeric member frictional interface surface segment and inhibiting a rotation of the nonelastomeric inner member relative to the outer member with the grease dams 48 inhibiting a migration of the grease 34. Preferably the grooved elastomer surface 32 includes a plurality of helical groove segments 46, preferably with grease dams 48 proximate the upper or the lower ends. Preferably the grooved elastomer surface 32 includes at least one groove type chosen from helical segments grooves 46, axial grooves 46', and circumferential grooves 46". Preferably the elastomer 28 includes at least one mold axial flat 52, preferably two mold flats 52, which preferably provide mirror image surface halves. Preferably the damper includes a grease inlet 50 for injecting grease 34 after insertion of inner member 11 into outer member 12, preferably with a grease receiving reservoir, preferably a circumferential groove 46". Preferably during use of the damper, periodically scheduled maintenance grease injections are injected through grease inlet 50 into grease reservoir groove 46".

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. An aircraft assembly rotational shimmy damper inner member for reception and rotation within an aircraft assembly shimmy damper nonelastomeric outer member inner axial center bore, said aircraft assembly shimmy damper inner member including a nonelastomeric inner member having an outer bonding surface segment, and an elastomeric shimmy damper member encompassing said nonelastomeric inner member outer bonding surface segment, said elastomeric shimmy damper member including an elastomer having an inner bonding surface segment and an outer grooved elastomer surface, said elastomeric damper inner bonding surface segment bonded to said nonelastomeric inner member outer bonding surface segment, said outer grooved elastomer surface includes at least one grease dam for retaining a grease between said elastomeric damper outer grooved elastomer surface and a nonelastomeric outer member frictional interface inner surface segment of an aircraft assembly shimmy damper nonelastomeric outer member inner axial center bore.

2. An aircraft assembly rotational shimmy damper inner member as claimed in claim 1, wherein said outer grooved elastomer surface with said at least one grease dam is distal from said nonelastomeric inner member outer bonding surface segment.

3. An aircraft assembly rotational shimmy damper inner member as claimed in claim 2, wherein said outer grooved elastomer surface is a molded outer grooved elastomer surface with said at least one grease dam radially extending outward and away from the inner bonding surface.

4. An aircraft assembly rotational shimmy damper inner member as claimed in claim 1, wherein said outer grooved elastomer surface is comprised of a plurality of grooves terminating with grease dams.

5. An aircraft assembly rotational shimmy damper inner member as claimed in claim 4, wherein said plurality of grooves terminating with grease dams are comprised of a plurality of helical groove segments terminating with said grease dams.

6. An aircraft assembly rotational shimmy damper inner member as claimed in claim 5, wherein said helical groove segments do not completely circle said nonelastomeric inner member.

7. An aircraft assembly rotational shimmy damper inner member as claimed in claim 1, wherein said outer grooved elastomer surface includes a first and a second mold flat.

8. An aircraft assembly rotational shimmy damper inner member as claimed in claim 7, wherein said first and second mold flats separate said outer grooved elastomer surface into two mirror image helical groove segment area halves with non-parallel helical groove orientations with opposite helical twists.

* * * * *